United States Patent
Schultz et al.

(10) Patent No.: US 12,038,190 B2
(45) Date of Patent: Jul. 16, 2024

(54) IDENTIFICATION DEVICE FOR AN HVAC CONTROLLER

(71) Applicant: Ademco Inc., Golden Valley, MN (US)

(72) Inventors: David Schultz, Savage, MN (US); Aaron Joseph Klein, Rochester, MN (US); Robert D. Juntunen, Minnetonka, MN (US); Luis Carlos Murillo Carrasco, Chihuahua (MX)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/993,926

(22) Filed: Aug. 14, 2020

(65) Prior Publication Data

US 2021/0172635 A1 Jun. 10, 2021

Related U.S. Application Data

(60) Provisional application No. 62/943,737, filed on Dec. 4, 2019.

(51) Int. Cl.

| | |
|---|---|
| *F24F 11/49* | (2018.01) |
| *F24F 11/58* | (2018.01) |
| *F24F 11/64* | (2018.01) |
| *F24F 11/65* | (2018.01) |
| *F24F 11/88* | (2018.01) |
| *G05B 19/042* | (2006.01) |
| *F24F 140/00* | (2018.01) |

(52) U.S. Cl.
CPC .............. *F24F 11/49* (2018.01); *F24F 11/58* (2018.01); *F24F 11/64* (2018.01); *F24F 11/65* (2018.01); *F24F 11/88* (2018.01); *G05B 19/042* (2013.01); *F24F 2140/00* (2018.01); *G05B 2219/2614* (2013.01)

(58) Field of Classification Search
CPC .. F24F 11/49; F24F 11/58; F24F 11/64; F24F 11/65; F24F 11/88; F24F 2140/00; F24F 11/50; G05B 19/042; G05B 2219/2614; F24H 9/20
See application file for complete search history.

(56) References Cited

U.S. PATENT DOCUMENTS

| | | | |
|---|---|---|---|
| 5,519,878 A * | 5/1996 | Dolin, Jr. ............ | H04L 12/2803 710/9 |
| 6,686,838 B1 | 2/2004 | Rezvani et al. | |
| 6,697,884 B1 * | 2/2004 | Katsch .................... | G06F 3/038 711/111 |

(Continued)

OTHER PUBLICATIONS

U.S. Appl. No. 62/943,731, by Romero et al., filed Dec. 4, 2019.

*Primary Examiner* — Darrin D Dunn
(74) *Attorney, Agent, or Firm* — Greenberg Traurig, LLP; Ryan D. Sharp; David J. Dykeman

(57) ABSTRACT

The disclosure describes an environmental control device with a head unit including processing circuitry and one or more sensors configured to send signals to an environmental control system to make adjustments to the room environment. The head unit is configured to connect to a wall plate that supports the head unit. The wall plate may include an ID device configured to identify the type environmental control equipment to which the wall plate is configured to connect. Once connected to the wall plate the head unit may detect the ID device, determine an ID value from the ID device and customize a presentation of setup parameters for the head unit.

17 Claims, 18 Drawing Sheets

(56) References Cited

U.S. PATENT DOCUMENTS

| | | | |
|---|---|---|---|
| 7,844,764 B2* | 11/2010 | Williams | F24F 11/74 |
| | | | 710/63 |
| 9,714,771 B1* | 7/2017 | Goodman | F24F 11/30 |
| 9,897,339 B2 | 2/2018 | Emmons et al. | |
| 11,487,259 B2* | 11/2022 | Noboa | F24F 11/32 |
| 2007/0049103 A1* | 3/2007 | Kashi | H01R 29/00 |
| | | | 439/396 |
| 2013/0087629 A1* | 4/2013 | Stefanski | G05D 23/1902 |
| | | | 236/1 C |
| 2016/0025366 A1 | 1/2016 | Snow et al. | |
| 2017/0060388 A1* | 3/2017 | Einaudi | G06F 3/167 |
| 2017/0234569 A1* | 8/2017 | Emmons | H05K 5/0017 |
| | | | 361/809 |
| 2017/0292729 A1* | 10/2017 | Schuler | G05B 15/02 |
| 2017/0364106 A1* | 12/2017 | Smith | G06Q 10/087 |
| 2018/0227172 A1* | 8/2018 | Hamber | H04L 41/0803 |
| 2018/0267794 A1* | 9/2018 | Atchison | F24F 11/32 |
| 2019/0023205 A1* | 1/2019 | Bryan | B60R 16/0315 |
| 2019/0145649 A1* | 5/2019 | Atchison | F24F 11/63 |
| | | | 700/276 |
| 2020/0041154 A1* | 2/2020 | Ribbich | F24F 11/49 |
| 2020/0050161 A1* | 2/2020 | Noboa | F24F 11/32 |
| 2020/0208864 A1* | 7/2020 | Wagner | F24F 11/523 |

* cited by examiner

IDENTIFICATION DEVICE FOR AN HVAC CONTROLLER

This Application claims the benefit of U.S. Provisional Patent Application 62/943,737, filed Dec. 4, 2019, the entire content of which is incorporated herein by reference.

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors. Environmental control systems may also include evaporative cooling systems, also referred to as "swamp coolers" in this disclosure, as well as other systems such as window mounted heat exchangers and two-part heat exchangers, which may be used for heating or cooling building spaces. Two-part heat exchangers may include an inside heat exchanger and an outside heat exchanger connected by piping. To simplify the explanation, an environmental control system will be referred to as an HVAC system, unless otherwise noted.

SUMMARY

In general, the disclosure describes an environmental control device configured to control an environmental control system for a building. The environmental control device may include a head unit with processing circuitry and one or more sensors configured to determine room temperature, humidity, air quality, light level and other factors and send signals to the environmental control system to make adjustments to the room environment. The head unit may be configured to connect to a wall plate that supports the head unit. The wall plate may include an ID device configured to identify the type or types of environmental control equipment to which the wall plate is configured to connect. For example, a wall plate may be configured to connect to a forced air furnace and an air conditioning unit. In other examples, the wall plate may be configured to connect to a heat pump and electric baseboard heaters. Once connected to the wall plate the head unit may detect the ID device, determine an ID value from the ID device and customize a presentation of setup parameters for the head unit. For example, when the ID value indicates the wall plate is configured for a geothermal heat pump, the head unit may present setup parameters for a geothermal heat pump, rather than for other equipment for which the wall plate is not configured to connect.

In one example, the disclosure describes an environmental control device, comprising: a wall plate comprising: a thermostat connection block; and an identification (ID) device; a head unit comprising: a memory; a wall plate connection block configured to communicatively couple the head unit to the wall plate; and processing circuitry configured to: determine an identification value from the ID device; based on the identification value, determining information defining environmental control equipment to which the wall plate is configured to connect; based on the identification value, configure one or more setup parameters for the environmental control device; and customize a presentation of setup parameters for the head unit based on the identification value and the environmental control equipment to which the wall plate is configured to connect.

In another example, the disclosure describes a method for configuring an environmental control device, the method comprising: determining, by processing circuitry of the environmental control device, whether a wall plate to which the environmental control device is connected includes an identification (ID) device; in response to determining that the wall plate includes the ID device, query the ID device; based on the query, determining, by the processing circuitry, an identification value from the ID device, wherein the identification value includes information defining environmental control equipment to which the wall plate is configured to connect; based on the identification value, determining, by the processing circuitry, the type and characteristics of the wall plate; performing, by the processing circuitry, setup functions for the environmental control device, wherein the processing circuitry customizes a presentation of setup parameters for the HVAC control device based on the identification value and the environmental control equipment to which the wall plate is configured to connect.

In another example, the disclosure describes a head unit configured as an environmental control device, the head unit comprising: a memory; a wall plate connection block configured to communicatively couple the head unit to the wall plate; and processing circuitry configured to: communicate with an identification (ID) device via the wall plate connection block; determine an identification value from the ID device; based on the identification value, determining information defining environmental control equipment to which the head unit is configured to connect via the wall plate connection block; based on the identification value, configure one or more setup parameters for the environmental control device; and customize a presentation of setup parameters for the head unit based on the identification value and the environmental control equipment to which the wall plate is configured to connect.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
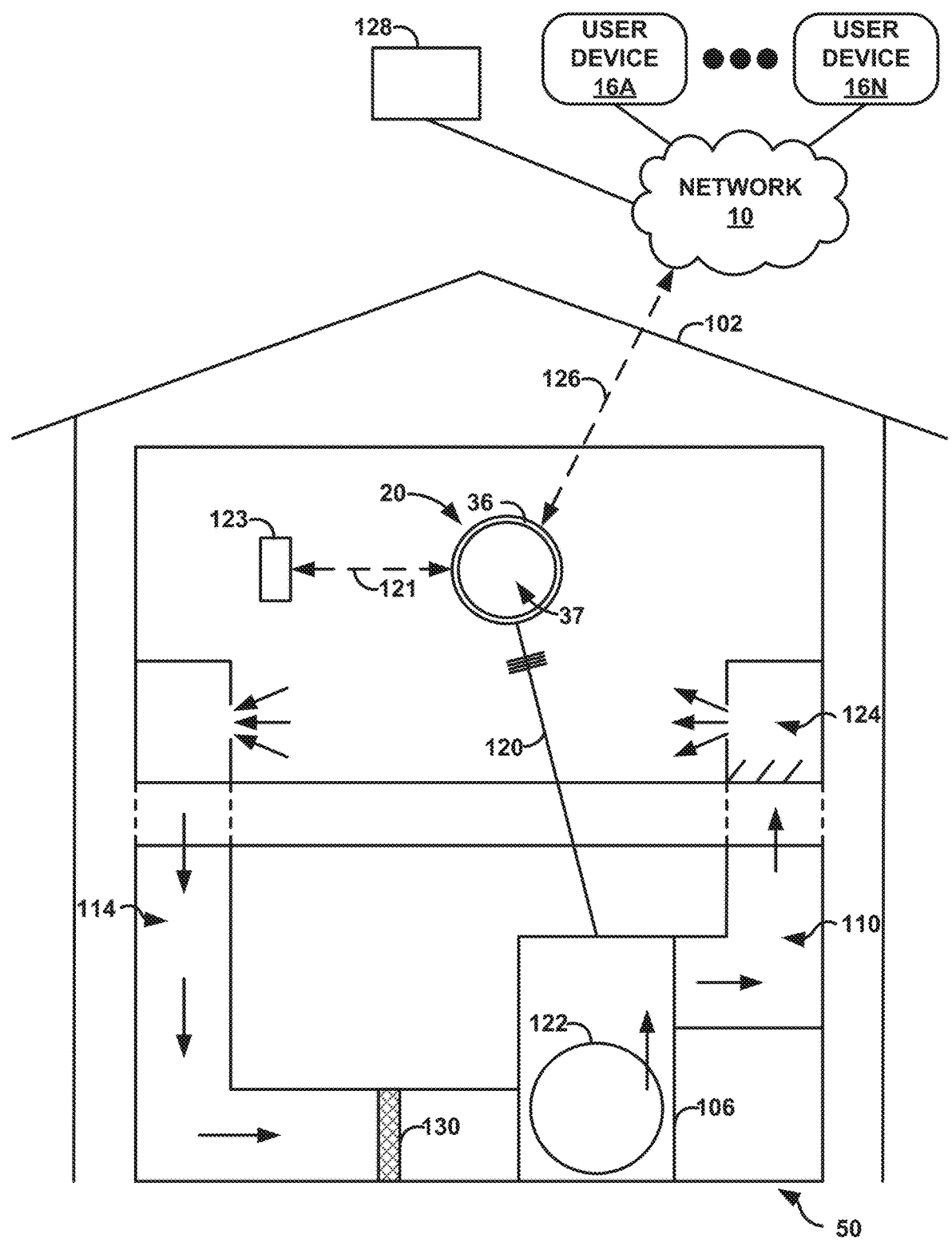
FIG. 1 is a block diagram illustrating an example heating, ventilation, and air conditioning (HVAC) system in a building, in accordance with one or more techniques described herein.

FIG. 1 is a block diagram illustrating an example heating, ventilation, and air conditioning (HVAC) system 50 in a building 102, in accordance with one or more techniques described herein. HVAC system 50 includes HVAC component 106, a system of ductwork and air vents including supply air duct 110 and a return air duct 114, and controller 20. HVAC component 106 may include, but is not limited to, a furnace, a heat pump, an electric heat pump, a geothermal heat pump, an electric heating unit, an air conditioning (AC) unit, a humidifier, a dehumidifier, an air exchanger, an air cleaner, a damper, a valve, a fan, and/or the like.

Controller 20 may be configured to control the comfort level (e.g., temperature and/or humidity) in building 102 by activating and deactivating HVAC component 106 in a controlled manner. Controller 20 may be configured to control HVAC component 106 via a wired or wireless communication link 120. In an example wired communication link 120 to HVAC component 106, controller 20 may connect to a plurality of wires (e.g., see FIGS. 2A-2D). Controller 20 may be a thermostat, such as, for example, a wall mountable thermostat. In some examples, controller 20 may be programmable to allow for user-defined temperature set points to control the temperature of building 102. Based on sensed temperature of building 102, controller 20 may turn on or off HVAC component 106 to reach the user-defined temperature set point. Although this disclosure describes controller 20 (and controllers shown in other figures) as controlling HVAC component 106 and determining whether an actual configuration includes an irregularity, external computing device 123 may also be configured to perform these functions. The techniques of this disclosure will primarily be described using examples related to temperature, but the systems, devices, and methods described herein may also be used in conjunction with other sensed properties, such as humidity or air quality. In some examples, controller 20 may be configured to control all of the critical networks of a building, including a security system.

HVAC component 106 may provide heated air (and/or cooled air) via the ductwork throughout the building 102. As illustrated, HVAC component 106 may be in fluid communication with every space, room, and/or zone in building 102 via ductwork 110 and 114, but this is not required. In operation, when controller 20 provides a heat call signal, HVAC component 106 (e.g. a forced warm air furnace) may turn on (begin operating or activate) to supply heated air to one or more spaces within building 102 via supply air ducts 110. HVAC component 106 and blower or fan 122 can force the heated air through supply air duct 110. In this example, cooler air from each space returns to HVAC component 106 (e.g. forced warm air furnace) for heating via return air ducts 114. Similarly, when a cool call signal is provided by controller 20, HVAC component 106 (e.g., an AC unit) may turn on to supply cooled air to one or more spaces within building 102 via supply air ducts 110. HVAC component 106 and blower or fan 122 can force the cooled air through supply air duct 110. In this example, warmer air from each space of building 102 may return to HVAC component 106 for cooling via return air ducts 114.

The system of vents or ductwork 110 and/or 114 can include one or more dampers 124 to regulate the flow of air, but this is not required. For example, one or more dampers 124 may be coupled to controller 20, and can be coordinated with the operation of HVAC component 106. Controller 20 may actuate dampers 124 to an open position, a closed position, and/or a partially open position to modulate the flow of air from the one or more HVAC components to an appropriate room and/or space in building 102. Dampers 124 may be particularly useful in zoned HVAC systems, and may be used to control which space(s) in building 102 receive conditioned air and/or receives how much conditioned air from HVAC component 106.

In many instances, air filters 130 may be used to remove dust and other pollutants from the air inside building 102. In the example shown in FIG. 1, air filter 130 is installed in return air duct 114 and may filter the air prior to the air entering HVAC component 106, but it is contemplated that any other suitable location for air filter 130 may be used. The presence of air filter 130 may not only improve the indoor air quality but may also protect the HVAC component 106 from dust and other particulate matter that would otherwise be permitted to enter HVAC component 106.

Controller 20 may include any suitable arrangement of hardware, software, firmware, or any combination thereof, to perform the techniques attributed to controller 20 herein. Examples of controller 20 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 20 includes software or firmware, controller 20 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Although not shown in FIG. 1, controller 20 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 20 (e.g., may be external to a package in which controller 20 is housed). For example, controller 20 may be able to store data to and read data from the memory included in external computing device 123 and/or the memory included in external database 128. The memory may be used for storing data such as possible wiring configurations of controller 20 and network settings such as an Internet Protocol (IP) address and/or a Media Access Control (MAC) address of controller 20, external computing device 123, and/or a router.

Controller 20 may include any number of wire terminals which make up a terminal block (e.g., a wall plate or a terminal plate) for receiving a plurality of control wires for one or more HVAC components 106 of HVAC system 50. The memory may store possible wiring configurations for HVAC components 106, enabling controller 20 to determine what HVAC components 106 are connected. The memory of controller 20 may also store settings for HVAC system 50 which correspond to the possible wirings configurations for HVAC components 106. For example, if controller 20 is wired to HVAC component 106 which includes an AC unit, controller 20 may determine settings to allow for cool call signals to control turning on and off of the AC unit.

In some examples, controller 20 may also include a memory for storing data about how previous controllers 20 have been configured. For example, the memory may store an expected wiring configuration associated with a certain geographic location. In some examples, the memory may store program instructions, which may include one or more program modules, which are executable by controller 20. When executed by controller 20, such program instructions may cause controller 20 to provide the functionality ascribed to it herein. The program instructions may be embodied in software, firmware, and/or RAMware.

In some examples, controller 20 may include a dial 36 which is located at an outer circumference of controller 20. Controller 20 may be fixed to a wall or another surface such that dial 36 may be rotated relative to one or more other components (e.g., display 37) of controller 20. Dial 36 may represent a user interface such that processing circuitry of controller 20 may receive, via dial 36, information indicative of a user input. In some examples, the user input may represent a user selection of a set point parameter value (e.g., a set point temperature), a user selection of information to be displayed by controller 20, or a user selection of another setting. Dial 36 may include a set of light-emitting diodes (LEDs). The processing circuitry of controller 20 may selectively illuminate one or more LEDs of the set of LEDs in order to indicate a set point temperature or convey other information. In some examples, dial 36 may smoothly rotate with respect to display 37. In some examples, dial 36 may rotate with one or more steps such that as dial 36 rotates, dial 36 "snaps" into position after every interval of rotational distance. In some examples, dial 36 may smoothly rotate with respect to display 37 and controller 20 may output an audio signal (e.g., a clicking noise) for every interval of rotational position (e.g., every one degree) in which dial 36 rotates.

Display 37 may include information relating to one or more aspects of an area in which controller 20 is located (e.g., a room in which controller 20 is located, a building in which controller 20 is located, an area outside of a building in which controller 20 is located, or any combination thereof). At least a portion of display 37, in some cases, represents an analog display. For example, display 37 may include a set of analog markers which are placed around at least a portion of a circumference of display 37. For example, each marker of the set of markers may extend from an outer circumference of display 37 and towards a center point of display 37. In some examples, the set of analog markers are located such that each analog marker of the set of analog markers is separated by one or more neighboring analog markers of the set of analog markers by a unit of rotational position (e.g., a unit of degrees and/or a unit of radians) For example, analog markers may be located five degrees from neighboring analog markers.

In some examples, each analog marker of the set of analog markers represents a parameter value of a parameter that HVAC controller 20 regulates. For example, the set of analog markers may represent a range of temperatures (e.g., from 40 degrees Fahrenheit (° F.) to 90° F.). In some such examples, the first analog marker of the set of analog markers may represent the lowest temperature of the range of temperatures and the last analog marker of the set of analog markers may represent the highest temperature of the range of temperatures. Display 37 may include a pointer (not illustrated in FIG. 1) connected to an electrical motor. The pointer may extend radially outwards from a center point of controller 20 and rotate about the center point of HVAC controller 20. As such, the processing circuitry of controller 20 may be configured to actuate the electrical motor in order to cause the pointer to indicate, or "point at" one or more analog markers of the set of analog markers. In some examples, the processing circuitry may cause the pointer to point at an analog marker of the set of analog markers which corresponds to a current temperature of the area in which controller 20 is located. For example, the processing circuitry of controller 20 may receive, from a temperature sensor, a temperature signal indicative of the current temperature of the area in which controller 20 is located. In some examples, the temperature sensor is located on or within controller 20. In some examples, the temperature sensor is separate from controller 20 and communicates with controller 20 via a wireless connection. The processing circuitry may control, based on the temperature signal, the electrical motor to cause the pointer to point at the analog marker associated with the current temperature.

In some examples, the processing circuitry of controller 20 may selectively illuminate one or more LEDs of the set of LEDs of dial 36 in order to indicate one or more set point parameter values, such as one or more set point temperature values. In some examples, the set of LEDs may be located within dial 36. In some examples, the set of LEDs may be located adjacent to dial 36. Each analog marker of the set of analog markers may be located at an outer diameter of display 37 (e.g., a farthest location from the center point of display 37), and dial 36 including the set of LEDs may be located at an outer diameter of controller 20, just beyond the outer diameter of display 37. As such, the processing circuitry of controller 20 may activate (e.g., illuminate) one or more LEDs proximate to an analog marker of the set of analog markers in order to indicate that a temperature associated with the analog marker is a set point temperature. In some examples, the processing circuitry may receive information indicative of a user selection of a set point temperature from dial circuitry that is electrically connected to dial 36. For example, based on a rotational movement and/or a rotational position of dial 36, the dial circuitry may generate a signal indicative of a user selection of a set point value and output the signal to the processing circuitry. In turn, the processing circuitry may selectively illuminate one or more LEDs of the set of LEDs on dial 36 in order to indicate the selected set point.

Since the pointer may be configured to point at one or more analog markers corresponding to a current temperature of the area in which controller 20 is located and dial 36 is configured to illuminate one or more LEDs proximate to one or more analog markers corresponding to the set point temperature for the area, display 37 and dial 36 may show the set point temperature and the current temperature using the same set of analog markers. It may be beneficial to display the set point temperature and the current temperature using the same set of analog markers in order to allow a user to more easily visualize a difference between the set point temperature and the current temperature as compared with an HVAC controller which does not show the set point temperature and the current temperature using the same set of analog markers.

In some examples, the processing circuitry of controller 20 may determine whether the set point temperature is greater than the current temperature. If the set point temperature is lower than the current temperature, the processing circuitry of controller 20 may output a signal to HVAC system 50 in order to cause the temperature in the area proximate controller 20 to decrease to the set point temperature. In some examples where the set point temperature is lower than the current temperature, controller 20 may output an instruction to the set of LEDs of dial 36 to output a first optical signal of a first color. In some examples, the first color is blue. If the set point temperature is greater than the current temperature, the processing circuitry of controller 20 may output a signal to HVAC system 50 in order to cause the temperature in the area proximate controller 20 to increase to the set point temperature. In some examples where the set point temperature is greater than the current temperature, controller 20 may output an instruction to the set of LEDs of dial 36 to output a second optical signal of a second color. In some examples, the second color is red.

Although the LEDs of dial 36 are described herein as indicating the set point temperature for the area in which controller 20 is located, this is not required. In some examples, the set of markers themselves may be illuminated in order to indicate one or more set point parameter values. For example, display 37 may include a set of LEDs configured to selectively illuminate one or more analog markers of the set of analog markers in order to indicate one or more set point parameter values, such as set point temperature values.

Additionally, although LEDs of dial 36 are described as emitting optical signals of a first color and a second color based on whether controller 20 is heating or cooling a space, one or more LEDs of display 37 may additionally or alternatively emit optical signals of a first color and a second color based on whether controller 20 is heating or cooling a space. In some examples, at least a portion of display 37 may include a digital display which may permit controller 20 to display information and/or accept one or more user inputs to controller 20. In some examples, controller 20 includes the digital display instead of an analog display or in combination with an analog display. In at least some examples where display 37 includes a digital display, display 37 may include a user interface which may permit a user to input various operating parameters (e.g., temperature set points, humidity set points, fan set points, starting times, ending times, schedule times, diagnostic limits, configuration settings, responses to alerts, and the like) to controller 20. In this disclosure, operating parameters may also be referred to as setup parameters. In some examples, the display may be a physical user interface that is accessible at controller 20 and may include a display and/or a distinct keypad. Display 37 may include any suitable display. In some examples, display 37 may include, or may be, a liquid crystal display (LCD), and in some cases an e-ink display, fixed segment display, or a dot matrix LCD display. The distinct keypad may include a numerical keypad, system of buttons, control knob, and the like. Additionally or alternatively, controller 20 can display information and/or accept user inputs via the user interface of external computing device 123. Thus, a user can interact with controller 20 through a mobile phone, a tablet, or a computer. For example, user devices 16A-16N (collectively, "user devices 16") may communicate with controller 20 via network 10.

In some examples, display 37 may include a presence sensitive device to detect user inputs to controller 20. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Display 37 of controller 20 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user. The user interface presented by the display of controller 20 may allow a user to program settings of controller 20, set temperature zones for building 102, configure desired temperatures for building 102 for different times of the day or days of the week, or other operating parameters. Display 37 of controller 20 may also be used to present user queries (e.g., what room controller 20 is installed in, what the address of building 102 is, what HVAC components 106 are connected to controller 20, etc.). Such queries may aid in installing and/or configuring controller 20 (e.g. when first connecting controller 20 to HVAC component 106 of HVAC system 50).

In some examples, display 37 may be configured to display any one of a set of screens, wherein each screen of the set of screens is related to a specific one or more parameters or one or more topics corresponding to the building in which HVAC controller is placed. For example, the set of screens may include a time and outdoor temperature screen, an inside temperature screen, an air quality screen, a water usage screen, an energy usage screen, and a security screen. In some examples, the processing circuitry of controller 20 may receive a signal indicative of a user selection of a screen of the set of screens for display by controller 20. For example, controller 20 may allow the set of screens to be scrolled across display 37.

Controller 20 may include a communication device (not illustrated in FIG. 1) to allow controller 20 to communicate via a wired or wireless connection 121 to one or more external computing devices 123. The communication device may include a Bluetooth transmitter and receiver, a Wi-Fi transmitter and receiver, a Zigbee transceiver, a near-field communication transceiver, or other circuitry configured to allow controller 20 to communicate with external computing device 123. In some examples, the communication device may allow controller 20 to exchange data with external computing device 123. Examples of exchanged data include a desired temperature for building 102, HVAC components 106 connected to controller 20, error codes, geographic location, estimated energy usage and cost, and/or other operating parameters or system performance characteristics for HVAC system 50.

Controller 20 may communicate via wired or wireless connection 121 with external computing device 123. External computing device 123 may be, include, or otherwise be used in combination with a mobile phone, smartphone, tablet computer, personal computer, desktop computer, personal digital assistant, router, modem, remote server or cloud computing device, and/or related device allowing controller 20 to communicate over a communication network such as, for example, the Internet or other wired or wireless connection. Communicating via the wired or wireless connection 121 may allow controller 20 to be configured, controlled, or otherwise exchange data with external computing device 123. In some examples, controller 20 communicating via wired or wireless connection 121 may allow a user to set up controller 20 when first installing the controller in building 102. In some examples, controller 20 and external computing device 123 communicate through a wireless network device such as a router or a switch. In other examples, controller 20 and external computing device 123 communicate through a wired connection such as an ethernet port, USB connection, or other wired communication network.

Controller 20 may, via the communication device, communicate via a wired or wireless connection 126 with external database 128. In some examples, wired or wireless connection 126 enables controller 20 to communicate with external database 128 via a wireless connection which includes a network device such as a router, ethernet port, or switch. Controller 20 and external database 128 may also communicate through a wired connection such as an ethernet port, USB connection, or other wired communication network. Communicating via the wired or wireless connection 126 may allow controller 20 to exchange data with external database 128. As such, external database 128 may be at a location outside of building 102. In some examples, external database 128 may be, include, or otherwise be used in combination with a remote server, cloud computing device, or network of controllers configured to communicate with each other. For example, controller 20 may check with HVAC controllers in nearby buildings through the internet or other city- or wide-area network. Controller 20 may include the onboard database because it is unable to communicate via the communication device.

In some examples, external database 128 may be, or otherwise be included in, or accessed via, external computing device 123 (e.g., smartphone, mobile phone, tablet computer, personal computer, etc.). For example, controller 20 may communicate via a Wi-Fi network connection with a smartphone device to exchange data with external database 128. By communicating via wired or wireless connection 126, controller 20 may exchange data with external database 128.

In some examples, controller 20 may display a setpoint as a bright white light at moving around a perimeter of controller 20. As dial 36 rotates, the light may move with dial 36 to show a selected setpoint. If the setpoint is changed via a mobile application on one or more of user devices 16, the light may move on controller 20 to show the selected setpoint. An application of one of user devices 16 may enable a user to view one or more aspects of controller 20.

In some examples, if a Buoy water valve is installed, controller 20 may receive details on water usage and leak status. In some examples, if a security system is installed, controller 20 may control the security system.

Figure 2:
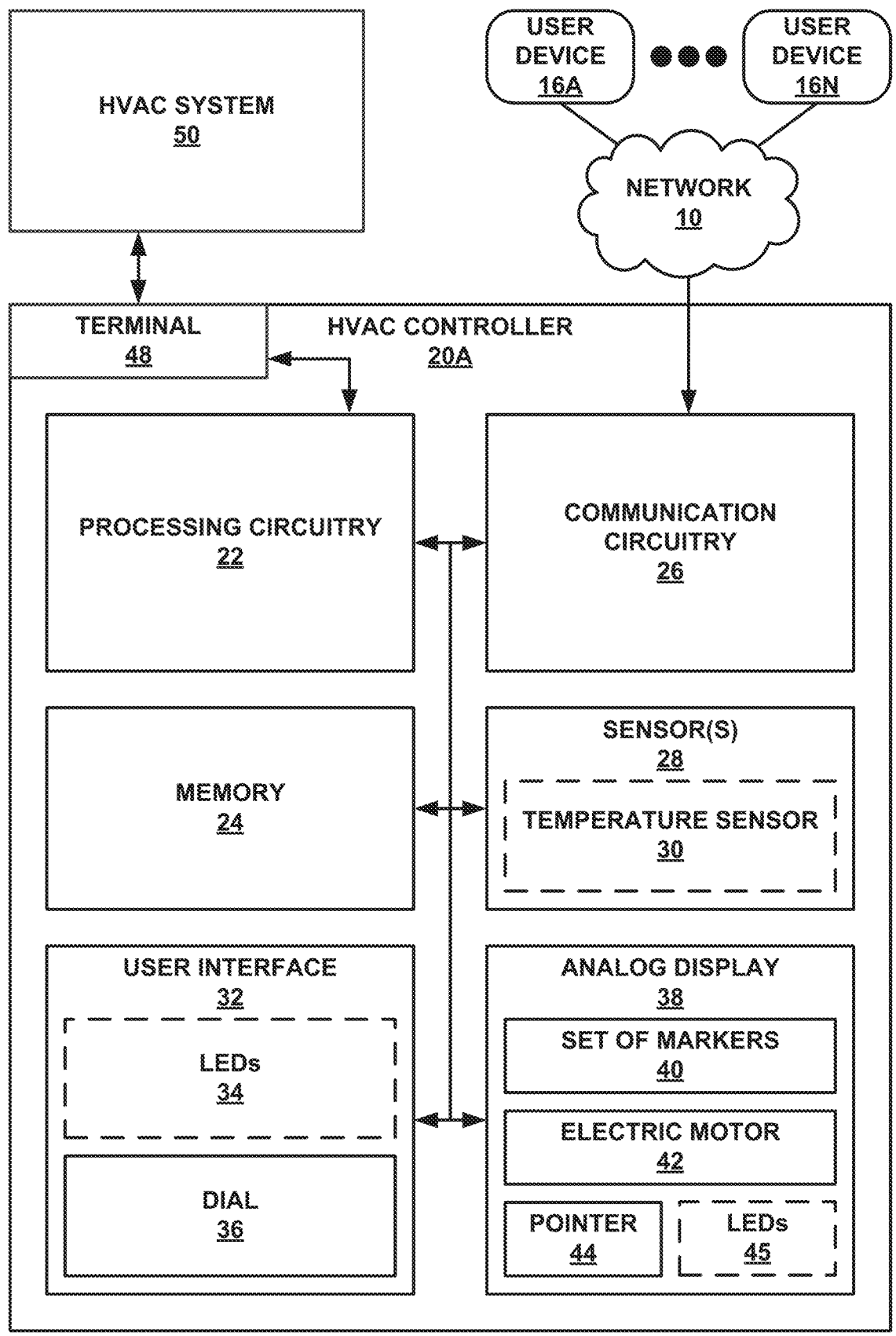
FIG. 2 is a block diagram illustrating an example HVAC controller including a dial and an analog display, in accordance with one or more techniques described herein.

FIG. 2 is a block diagram illustrating an example HVAC controller 20A including a dial 36 and an analog display 38, in accordance with one or more techniques described herein. As seen in FIG. 2, HVAC controller 20A includes processing circuitry 22, memory 24, communication circuitry 26, sensor(s) 28, user interface 32, and analog display 38, and terminal(s) 48. Sensor(s) 28 may, in some examples, include a temperature sensor 30. User interface 32 includes dial 36. Analog display 38 includes a set of markers 40, an electric motor 42, and a pointer 44. In some examples, user interface 32 includes LEDs 34. In some examples, analog display 38 includes LEDs 45. HVAC controller 20A may be configured to communicate with HVAC system 50 via terminal(s) 48 and/or communicate with user devices 16A-16N (collectively, "user devices 16") via network 10. In some examples, HVAC controller 20A is an example of HVAC controller 20 of FIG. 1. In some examples, analog display 38 is an example of display 37 of FIG. 1.

HVAC controller 20A may be configured to control HVAC system 50 in order to regulate one or more parameters of a space (e.g., a building, one or more rooms within a building, a large vehicle, or a vessel). In some examples, HVAC controller 20A regulates a temperature within the space. HVAC controller 20A may regulate the temperature of the space by using HVAC system 50 to decrease a temperature of the space if the current temperature of the space is greater than a first set point temperature and/or increase a temperature of the space using HVAC system 50 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 22 may include fixed function circuitry and/or programmable processing circuitry. Processing circuitry 22 may include any one or more of a microprocessor, a controller, a DSP, an ASIC, an FPGA, or equivalent discrete or analog logic circuitry. In some examples, processing circuitry 22 may include multiple components, such as any combination of one or more microprocessors, one or more controllers, one or more DSPs, one or more ASICs, or one or more FPGAs, as well as other discrete or integrated logic circuitry. The functions attributed to processing circuitry 22 herein may be embodied as software, firmware, hardware, or any combination thereof.

In some examples, memory 24 includes computer-readable instructions that, when executed by processing circuitry 22, cause HVAC controller 20A and processing circuitry 22 to perform various functions attributed to HVAC controller 20A and processing circuitry 22 herein. Memory 24 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Communication circuitry 26 may include any suitable hardware, firmware, software, or any combination thereof for communicating with another device, such as user devices 16 or other devices. Under the control of processing circuitry 22, communication circuitry 26 may receive downlink telemetry from, as well as send uplink telemetry to, one of user devices 16 or another device with the aid of an internal or external antenna. Communication circuitry 26 may include a Bluetooth transmitter and receiver, a Wi-Fi transmitter and receiver, a Zigbee transceiver, a near-field communication transceiver, or other circuitry configured to allow controller 20A to communicate with one or more remote devices such as user devices 16. In some examples, communication circuitry 26 may allow controller 20A to exchange data with external computing device 123 of FIG. 1. Examples of exchanged data include a desired temperature for the space, one or more control parameters for HVAC system 50, error codes, geographic location, estimated energy usage and cost, and/or other operating parameters or system performance characteristics for HVAC system 50.

In some examples, HVAC controller 20A includes one or more sensor(s) 28 including temperature sensor 30. In some examples, temperature sensor 30 is located within a housing of controller 20A. In some examples, temperature sensor 30 is located remotely from controller 20A and may communicate with controller 20A via communication circuitry 26. For example, temperature sensor 30 may be located in the same room or the same area as controller 20A while being separate from controller 20A such that heat generated from components of controller 20A does not affect a temperature signal generated by temperature sensor 30. It may be beneficial for temperature sensor 30 to be located separately from controller 20A in order to obtain an accurate temperature reading. In some examples where temperature sensor 30 is located within the housing of controller 20A, controller 20A may prevent components from affecting a temperature signal generated by temperature sensor 30. In some examples, at least a portion of the housing of controller 20A may include stainless steel and the housing may be coated with a material which hides fingerprints. In some examples, the term "housing" may be used herein to describe an outer surface of controller 20A, including on outer surface of dial 36, an outer surface of analog display 38, and an outer face of controller 20A which is fixed to a wall or another surface.

User interface 32 may include dial 36. In some examples, a housing of HVAC controller 20A may be substantially cylindrical in shape and Dial 36 may represent a ring-shaped piece that is located at an outer circumference of HVAC controller 20A. In some examples, controller 20A includes a first face configured to be mounted on a plate which is fixed to a wall or another surface, a second face including a display, and a third face representing a side of HVAC controller 20A, the third face extending around a circumference of HVAC controller 20A. Dial 36 may include the third face of controller 20A. In some examples, dial 36 is configured to rotate with respect to one or more other components of controller 20A. For example, dial 36 is configured to rotate with respect to analog display 38. In some examples, dial 36 is configured to rotate in response to a user input. Dial 36 may be electrically connected to dial circuitry (not illustrated in FIG. 2) which may generate an electrical signal indicative of one or more rotational parameters (e.g., a rotational position, a rotational velocity, and/or a rotational acceleration) of dial 36. The dial circuitry may output the electrical signal indicative of the one or more rotational parameters to processing circuitry 22. In some examples, the dial circuitry is part of processing circuitry 22.

Analog display 38 may be located on a face (e.g., the second face) of controller 20A. In some examples, analog display 38 may include a set of markers 40, an electric motor 42, and a pointer 44 connected to electric motor 42. Each mark of the set of markers 40 may represent a respective parameter value of a parameter corresponding to HVAC controller 20A. For example, the parameter may include temperature and each mark of the set of markers 40 may represent a respective temperature value. For example, the temperature values corresponding to the set of markers may be within a range from 40° F. to 90° F., but this is not required. The temperature values may represent another range of temperatures. In some examples, the set of markers 40 may be spaced evenly across a portion of the circumference of analog display 38. For example, each marker of the set of markers 40 may be separated from each neighboring marker of the set of markers 40 by a predetermined distance.

Pointer 44 may extend along a radius of analog display 38 and pointer 44 may be configured to rotate about a center point of analog display 38 such that pointer 44 "points" at one or more markers of the set of markers 40. In some examples, electric motor 42 may receive an electric signal from processing circuitry 22 which causes electric motor 42 to place pointer 44 in order to indicate a current temperature of the space in which controller 20A is performing temperature regulation using HVAC system 50. In some examples, processing circuitry 22 receives a temperature signal from temperature sensor 30, the temperature signal indicating the current temperature of the space in real-time or near real-time. Processing circuitry 22 may cause electric motor 42 to place (e.g., rotate) the pointer 44 based on the temperature signal in order to indicate the current temperature by pointing pointer 44 at a mark of the set of markers 40 which corresponds to the current temperature.

Processing circuitry 22 may be configured to set and/or change one or more temperature set points corresponding to the space in which controller 20A regulates temperature. For example, a first set point temperature may represent a cooling set point temperature and a second set point temperature may represent a heating set point temperature. In some examples, if HVAC controller 20A is in a cooling mode and the current temperature is greater than the cooling set point temperature, processing circuitry 22 may control HVAC system 50 to regulate the temperature in the space to approach the cooling set point temperature over a period of time based on the current temperature and the cooling set point temperature. In some examples, if HVAC controller 20A is in a heating mode and the current temperature is less than the heating set point temperature, processing circuitry 22 may control HVAC system 50 to regulate the temperature in the space to approach the heating set point temperature over a period of time based on the current temperature and the heating set point temperature.

In some example, processing circuitry 22 is configured to receive an instruction to change and/or set one or more temperature set points of controller 20A from dial circuitry electrically connected to dial 36, where the instruction is indicative of a user selection of one or more temperature set points using dial 36. For example, in response to a first rotation of dial 36, processing circuitry 22 may set the cooling temperature set point value to a first temperature value if a cooling set point mode of HVAC controller 20A is activated. In some examples, controller 20A includes a mode button (not illustrated in FIG. 2) electrically connected to processing circuitry 22 which is configured to generate a signal based on a user request to switch a set point mode between the cooling set point mode and a heating set point mode. In response to a second rotation of dial 36, processing circuitry 22 may set the heating temperature set point value to a second temperature value if a heating set point mode of HVAC controller 20A is activated. In some examples, processing circuitry 22 is configured to receive an instruction to change and/or set one or more temperature set points of controller 20A from one or more of user devices 16 via network 10. Processing circuitry 22 may change the one or more temperature set points based on such an instruction.

In some examples, user interface 32 includes LEDs 34. LEDs 34 may be, in some cases, a part of dial 36. In some examples, each LED of LEDs 34 may be configured to output an optical signal. LEDs 34 may be arranged in an array around the circumference of dial 36 such that the optical signal output by each LED of LEDs 34 is emitted outwards from a face of HVAC controller 20A which includes analog display 38. In some examples, processing circuitry 22 may be configured to selectively activate LEDs 34 in order to indicate one or more set point temperatures. Since LEDs 34 may be located on a same face of HVAC controller 20A as the set of markers 40 which represent a range of temperature values, processing circuitry 22 may activate one or more LEDs of LEDs 34 proximate to a marker of the set of markers 40 corresponding to a set point temperature (e.g., one or both of the cooling set point temperature and the heating set point temperature). In some examples, all of LEDs 34 are activated, but the LEDs 34 proximate to the marker of the set of markers 40 corresponding to the set point temperature are emitting an optical signal of a different color that the LEDs of LEDs 34 that are not proximate to the marker of the set of markers 40 corresponding to the set point temperature.

In some examples, processing circuitry 22 is configured to cause at least some of LEDs 34 to output an optical signal of a first color when HVAC controller 20A is in a heating mode and the current temperature is lower than the heating set point temperature. In some examples, processing circuitry 22 is configured to cause at least some of LEDs 34 to output an optical signal of a second color when HVAC controller 20A is in a cooling mode and the current temperature is greater than the cooling set point temperature. In some examples, the first color is red, and the second color is blue, but this is not required. Each of the first color and the second color may represent any visible wavelength of light.

In some examples, analog display 38 includes LEDs 45. In some examples, processing circuitry 22 is configured to selectively activate LEDs 45 in order to selectively illuminate one or more of the set of markers 40. In some examples, processing circuitry 22 selectively illuminates one or more of the set of markers in order to indicate one or more temperature set points (e.g., the cooling set point and/or the heating set point). In some examples, HVAC controller 20A includes LEDs 45 instead of LEDs 34. In some examples, controller 20A includes both of LEDs 34 and LEDs 45. LEDs 45 may be located behind a surface of analog display 38 which includes the set of markers 40. In some examples, LEDs 45 may emit optical signals which cause one or more markers of the set of markers 40 to light up.

Figure 3:
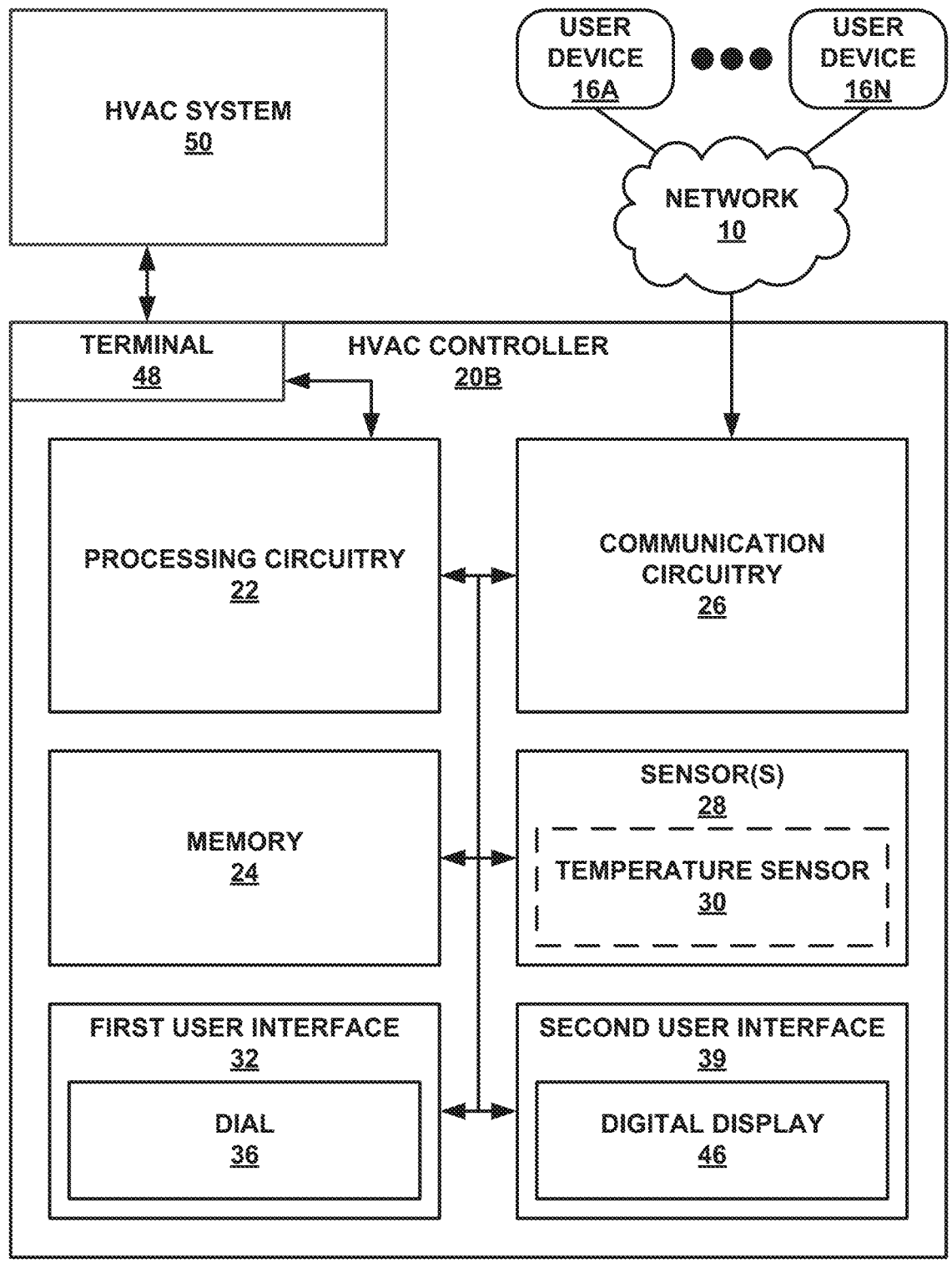
FIG. 3 is a block diagram illustrating an example HVAC controller including a digital display, in accordance with one or more techniques described herein.

FIG. 3 is a block diagram illustrating an example HVAC controller 20B including a digital display 46, in accordance with one or more techniques described herein. As seen in FIG. 3, HVAC controller 20B includes processing circuitry 22, memory 24, communication circuitry 26, sensor(s) 28, first user interface 32, second user interface 39, and terminal(s) 48. Sensor(s) 28 may, in some examples, include a temperature sensor 30. In addition to or in lieu of sensor(s) 28, HVAC controller 20B may also be in wired or wireless communication with one or more remote sensors. The one or more remote sensors may enable HVAC controller 20B to determine conditions, such as temperatures or humidity levels, at locations other than where HVAC controller 20B is located.

First user interface 32 includes dial 36. Second user interface 39 includes a digital display 46. HVAC controller 20B may be configured to communicate with HVAC system 50 via terminal(s) 48 and/or communicate with user devices 16A-16N (collectively, "user devices 16") via network 10. In some examples, HVAC controller 20B is an example of HVAC controller 20 of FIG. 1. In some examples, second user interface 39 including digital display 46 is an example of display 37 of FIG. 1. In some examples, HVAC controller 20B may be substantially the same as HVAC controller 20A of FIG. 1 except that digital display 46 configured to receive user input is included in controller 20B whereas controller 20A includes an analog display 38 which does not receive user input.

Digital display 46 may, in some cases, be substantially circular in shape. In some examples, digital display may include a presence sensitive device to detect user inputs to controller 20B. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Display 37 of controller 20 may function as an output device using any one or more display devices, such as an LCD, dot matrix display, LED display, organic LED (OLED) display, e-ink, or similar monochrome or color display capable of outputting visible information to a user.

In some examples, digital display 46 may display a set of screens, which may be referred to herein as a "carousel" of screens. In some examples, each screen of the carousel of screens may be related to one or more parameters of an environment in which controller 20B is located, one or more settings of controller 20B, and/or one or more other aspects associated with controller 20B. For example, the carousel of screens may include a time & outdoor temperature screen, a comfort (e.g., inside temperature) screen, an air quality screen, a water screen, an energy screen, and a security screen. In some examples, digital display 46 may scroll through the carousel of screens based on user input. In some examples, digital display 46 may scroll through the carousel of screens without user input.

Figure 4A:
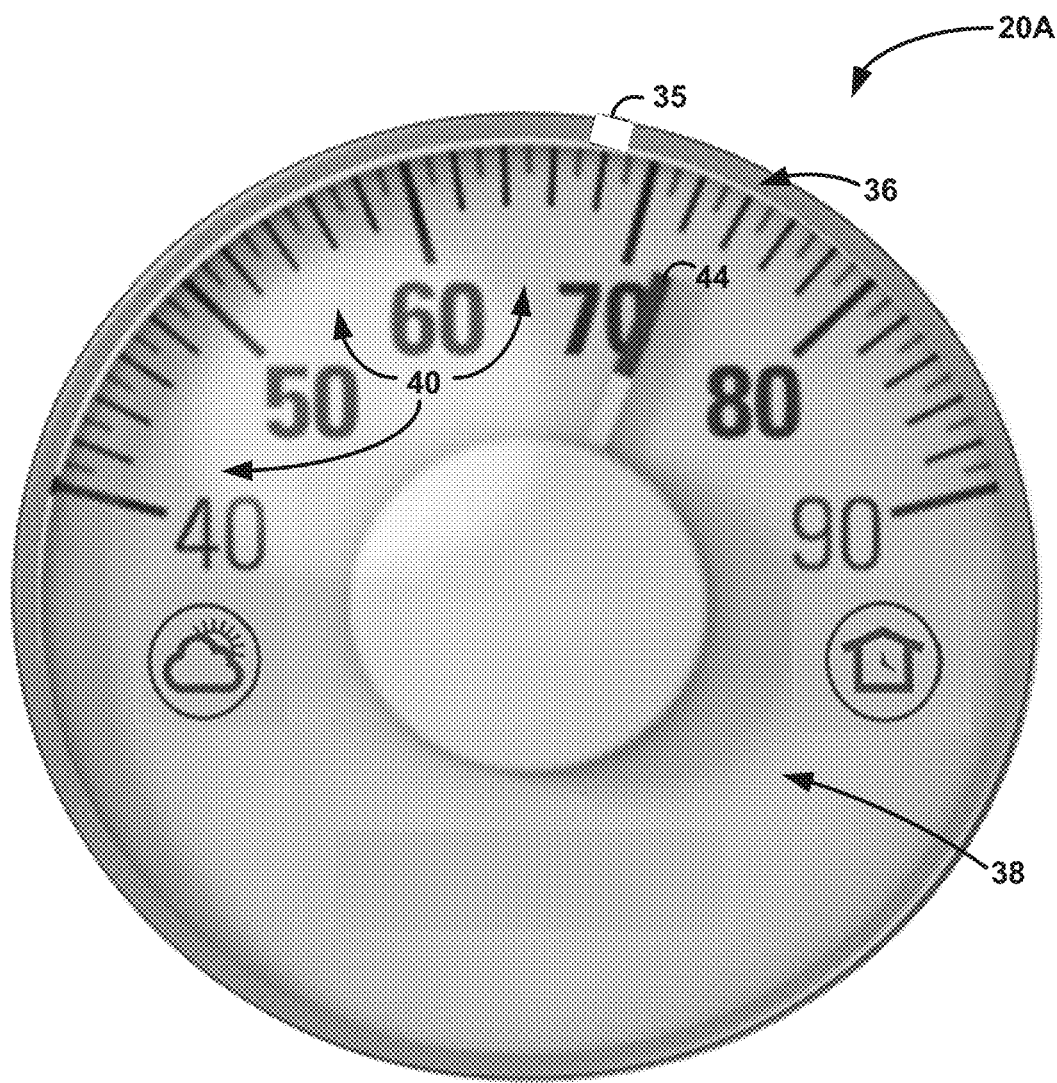
FIG. 4A is a conceptual diagram illustrating an example HVAC controller including a dial emitting an optical signal of a first color and an analog display, in accordance with one or more techniques described herein.

FIG. 4A is a conceptual diagram illustrating an example HVAC controller 20A including a dial 36 emitting an optical signal of a first color and an analog display 38, in accordance with one or more techniques described herein. The form factor and design shown in FIG. 4A for HVAC controller 20A is not necessarily the only form that HVAC controller 20A may take. The techniques described herein with respect to HVAC controller 20A may be implemented in other devices with different forms and designs.

As seen in FIG. 4A, analog display 38 includes a set of markers 40 which correspond to a range of temperatures extending from 40° F. to 90° F., although this range of temperatures is not meant to be limiting. In some examples, the range of temperatures may include any range of temperatures according to any unit of measurement (Fahrenheit, Celsius, Kelvin or any combination thereof). Analog display 38 includes pointer 44 which is configured to point at one or more markers of the set of markers 40. In the example of FIG. 4A, pointer 44 is pointing at a marker of the set of markers 40 which corresponds to approximately 72° F. indicating that a current temperature of an area in which controller 20A is located is approximately 72° F. In some examples, pointer 44 may be connected to an electrical stepper motor (e.g., electric motor 42 of FIG. 2) which is configured to rotate pointer 44 about a center point of analog display 38 in order to point pointer 44 at a marker of the set of markers 40 that corresponds, for example, to a determined current temperature. In some examples, it may be beneficial for pointer 44 to be connected to a stepper motor so that HVAC controller 20A may more accurately convey a current temperature as compared with, for example, HVAC controllers that convey the current temperature using a pointer that is controlled by a bi-metallic mechanical device. Furthermore, compared to typical bi-metallic mechanical devices, an HVAC controller utilizing a stepper motor in the manner described herein may achieve a better match between a displayed current temperature and a setpoint at which the controller begins cooling or heating, or other HVAC functionality.

In some examples, dial 36 includes a set of LEDs (e.g., LEDs 34 of FIG. 2), wherein each LED of the set of LEDs is configured to output an optical signal. In some examples, processing circuitry 22 is configured to selectively illuminate individual LEDs of the set of LEDs in order to indicate one or more set point temperatures. As seen in FIG. 4A, LED 35 is illuminated, where LED 35 is proximate a marker of the set of markers 40 which corresponds to a temperature of approximately 68° F. As such, in the example of FIG. 4A, HVAC controller 20A indicates that a set point temperature is 68° F. Since the set point temperature of 68° F. is lower than the current temperature of approximately 72° F., HVAC controller 20A may user HVAC system 50 to cause the temperature in the area proximate to HVAC controller 20A to decrease to the set point temperature over a period of time. In some examples, one or more of the set of LEDs of dial 36 output an optical signal of a first color, where the first color corresponds to a cooling mode of HVAC controller 20A. In some examples, the one or more of the set of LEDs of dial 36 which output the optical signal of the first color do not include LED 35, which indicates the set point temperature. As such, a color of an optical signal emitted by LED 35 may be different than the first color. In some examples, the first color is blue.

Figure 4B:
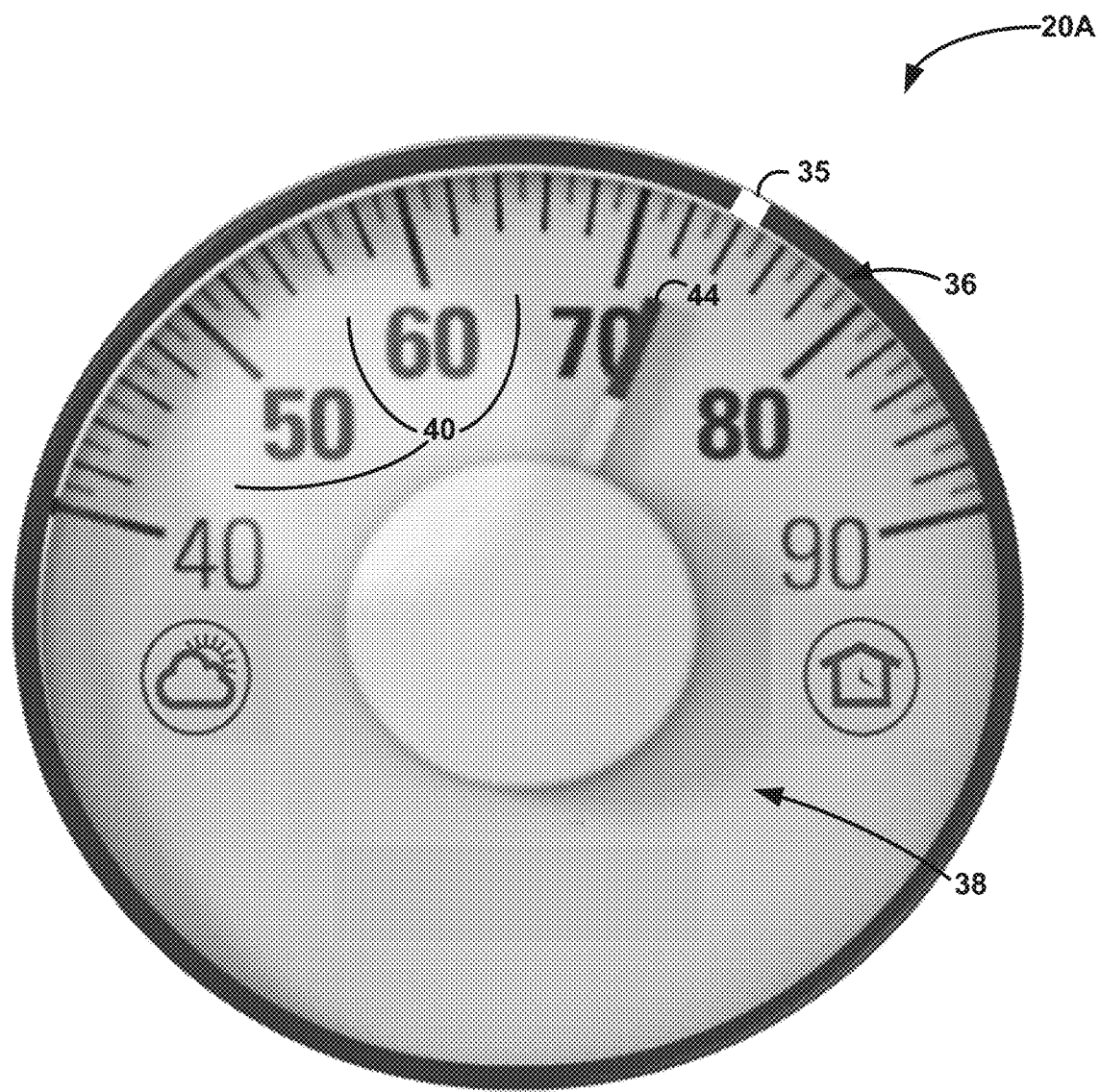
FIG. 4B is a conceptual diagram illustrating an example HVAC controller including a dial emitting an optical signal of a second color and an analog display, in accordance with one or more techniques described herein.

FIG. 4B is a conceptual diagram illustrating an example HVAC controller 20A including a dial 36 emitting an optical signal of a second color and an analog display 38, in accordance with one or more techniques described herein. In some examples, the HVAC controller 20A of FIG. 4B is substantially the same as the HVAC controller 20A of FIG. 4A except that a set point temperature of the HVAC controller 20A of FIG. 4B is different than the set point temperature of the HVAC controller 20A of FIG. 4A. For example, as seen in FIG. 4A, LED 35 is illuminated, where LED 35 is proximate a marker of the set of markers 40 which corresponds to a temperature of approximately 74° F. As such, in the example of FIG. 4A, HVAC controller 20A indicates that a set point temperature is 74° F. Since the set point temperature of 74° F. is greater than the current temperature of approximately 72° F., HVAC controller 20A may user HVAC system 50 to cause the temperature in the area proximate to HVAC controller 20A to increase to the set point temperature over a period of time. In some examples, one or more of the set of LEDs of dial 36 output an optical signal of a second color, where the second color corresponds to a heating mode of HVAC controller 20A. In some examples, the one or more of the set of LEDs of dial 36 which output the optical signal of the second color do not include LED 35, which indicates the set point temperature. As such, a color of an optical signal emitted by LED 35 may be different than the second color. In some examples, the second color is red. In some examples, instead of being displayed using LEDs of dial 36, the set point temperature may be shown by a digital display on a same face of HVAC controller 20A which includes analog display 38.

Figure 5A:
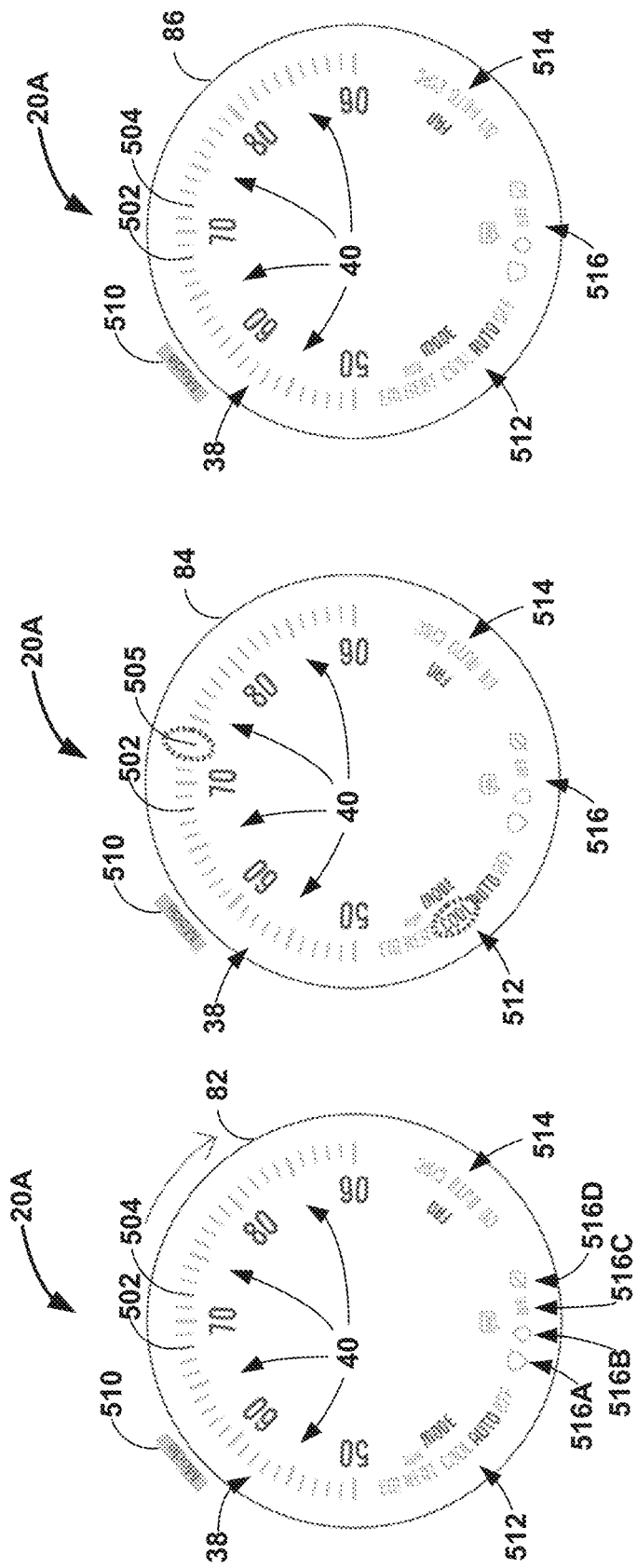
FIG. 5A is a conceptual diagram illustrating a first configuration of an analog display, a second configuration of the analog display, and a third configuration of the analog display, in accordance with one or more techniques described herein.

FIG. 5A is a conceptual diagram illustrating a first configuration 82 of analog display 38, a second configuration 84 of analog display 38, and a third configuration 86 of analog display 38, in accordance with one or more techniques described herein. The configurations of analog display 38 illustrated in FIG. 5A represent examples configurations for analog display 38 of FIG. 2 including LEDs 45, although other configurations are also within the scope of this disclosure. As shown in the example of FIG. 5A, analog display 38 may include a set of markers 40 including marker 502, marker 504, and marker 505. Additionally, analog display 38 may include a set of mode indicators 512, where the set of mode indicators may indicate which set point of a group of set points is to be updated based on user input to dial 36. Analog display 38 of FIG. 5A may be an example of the analog display 38 which is included by controller 20A of FIG. 2. Controller 20A may, include Mode button 510 may be allow a user to toggle between modes of the set of mode indicators 512. The modes in the example of FIG. 5A include an EM mode, a heat mode, a cool mode, an auto mode, and an off mode, but different, additional, or fewer modes may also be used. The selected or active mode may be illuminated or otherwise marked in a manner that is distinguishable from the unselected or inactive modes. In some examples, controller 20A may include a fan button (i.e., "FAN" in FIG. 5A) which controls one or more fan settings given by fan setting indicators 514. In the example of FIG. 5A, the fan settings include ON, AUTO, and CIRC, but different, additional, or fewer settings may also be used. The selected or active setting may be illuminated or otherwise marked in a manner that is distinguishable from the unselected or inactive settings.

Figure 5B:
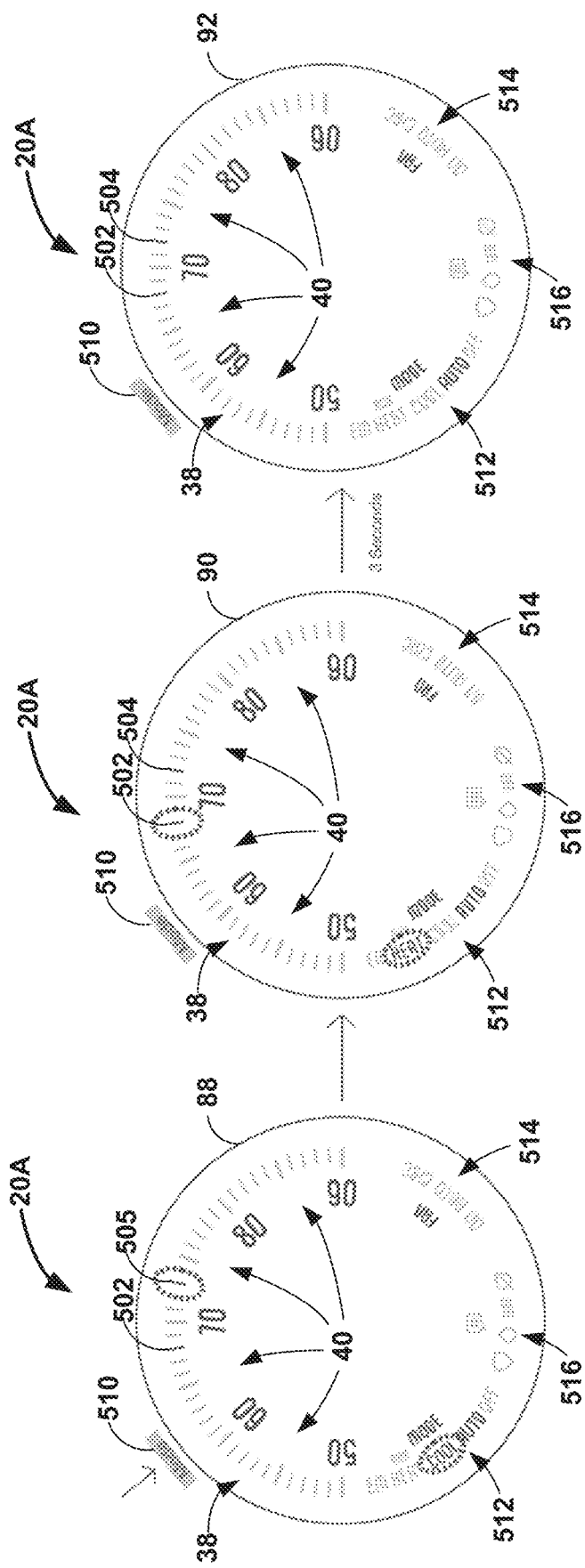
FIG. 5B is a conceptual diagram illustrating a fourth configuration of an analog display, a fifth configuration of the analog display, and a sixth configuration of the analog display, in accordance with one or more techniques described herein.
Figure 5C:
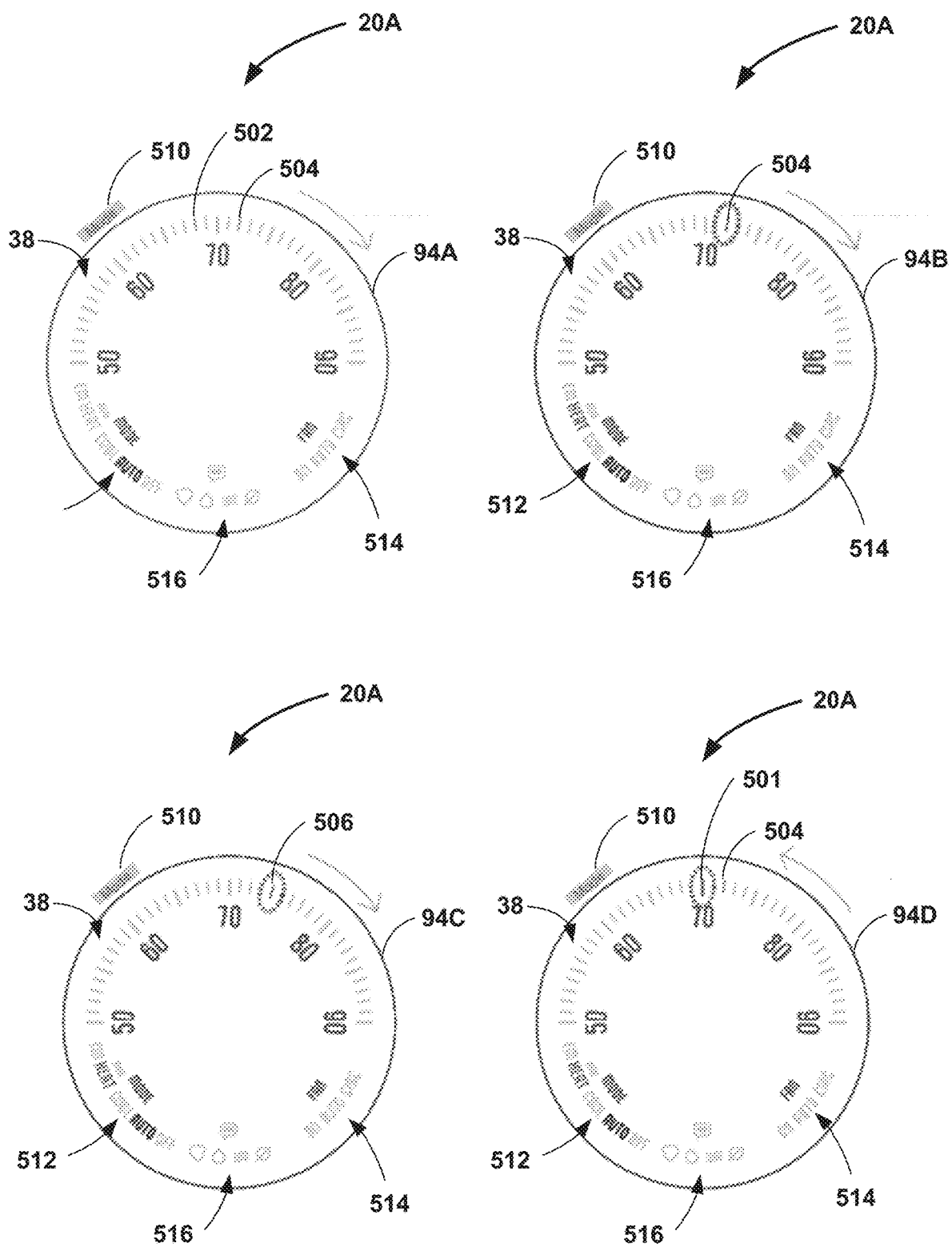
FIG. 5C is a conceptual diagram illustrating the analog display of FIGS. 5A-5B including configurations in which a first temperature set point runs into another temperature set point, in accordance with one or more techniques described herein.

As seen in FIGS. 5A-5C, controller 20A may include a set of indicators 516A-516D (collectively, "indicators 516") including a security warning indicator 516A, a water warning indicator 516B, an air quality warning indicator 516C, and an energy warning indicator 516D. A warning indicator of indicators 516 may be illuminated by one or more LEDs configured to illuminate an associated icon on analog display 38 in response to processing circuitry 22 receiving a warning signal from a system corresponding to the respective warning indicator. For example, if processing circuitry 22 determines that one or more irregularities exist in a security system, processing circuitry 22 may output a signal to illuminate security warning indicator 516A. The warning indicator may alert a user to a potential problem. In some instances, HVAC controller may 20A may be in communication with other systems and devices, such that if the user sees the warning indicator on HVAC controller 20A, then the user will know to obtain additional details regarding the warning via a different device, such as a smart phone or tablet or at the source of problem. Other types of indicators, in addition to or in lieu of warning indicators, may also be used.

The first configuration 82 of analog display 38 may indicate that a first temperature set point is indicated by marker 502, which is illuminated by one or more LEDs of LEDs 45. Marker 502 corresponds to 68° F. In this way, the first temperature set point may be 68° F. Additionally, the first configuration 82 of analog display 38 indicates that a second temperature set point is indicated by marker 504. Marker 504 corresponds to 72° F. In this way, the second temperature set point may be 72° F. The set of mode indicators 512 indicates that an "AUTO" mode is enabled, meaning that in response to a rotation of dial 36, a set point of the first temperature set point and the second temperature set point which was most recently changed may be updated. In some examples, the analog display 38, various configurations of which are shown in FIGS. 5A-5C, may be illuminated by one or more of a number of LEDs, where the number of LEDs is within a range from 50 LEDs to 100 LEDs. In some examples, the number of LEDs is 67 LEDs.

At configuration 84, dial 36 may rotate, causing the second temperature set point (e.g., the "cooling set point") to change from marker 504 to marker 505. For example, it might be the case that the cooling set point was more recently changed than the heating set point. As such, when dial 36 is rotated, HVAC controller 20A may automatically update the cooling set point rather than update the heating set point, since the cooling set point was more recently updated. As HVAC controller 20A is updating the cooling temperature set point from marker 504 to marker 505, the "COOL" mode indicator may blink in tandem with the marker of the set of markers corresponding to the current cooling set point temperature. By causing the marker corresponding to the current cooling set point temperature to blink while HVAC controller 20A updates the cooling set point in response to a user input to dial 36, HVAC controller 20A may allow a user to differentiate between the cooling setpoint, which is being updated from marker 504 to marker 505 based on a rotation of dial 36, and the heating setpoint, which is not being updated based on a rotation of dial 36. In some examples, after a period of time following a rotation of dial 36, the "COOL" mode indicator and the marker corresponding to the cooling set point may stop blinking. In some examples, the period of time represents a 3-second window of time.

FIG. 5B is a conceptual diagram illustrating a fourth configuration 88 of analog display 38, a fifth configuration 90 of analog display 38, and a sixth configuration 92 of analog display 38, in accordance with one or more techniques described herein. In some examples, the configurations of analog display 38 illustrated in FIG. 5B are examples of the analog display 38 of FIG. 2 including LEDs 45. For example, analog display 38 may include a set of markers 40 including marker 502, marker 504, and marker 505. Additionally, analog display 38 may include a set of mode indicators 512, where the set of mode indicators may indicate which set point of a group of set points is to be updated based on user input to dial 36. Mode button 510 may be allow a user to toggle between modes of the set of mode indicators 512.

In some examples, when dial 36 is initially turned in fourth configuration 88, the cooling set point of HVAC controller 20A might have been more recently updated than the heating set point of HVAC controller 20A. As such, the "COOL" mode indicator of the set of mode indicators 512 and the marker corresponding to the cooling temperature set point (e.g., marker 505) are configured to blink in tandem, thus informing a user that a rotation of dial 36 may cause the cooling temperature set point to change. In some examples, processing circuitry 22 may receive information indicative of a user input to mode button 510. In response to receiving the user input, processing circuitry may update the set point mode from a cooling set point mode to a heating set point mode. In turn, the "HEAT" mode indicator may start blinking, as seen in fifth configuration 90 of analog display 38. After the set point mode is changed from the cooling set point mode to the heating set point mode, processing circuitry 22 may change the heating temperature set point based on a rotation of dial 36. After a period of time following the rotation of dial 36, analog display 38 may transition to sixth configuration 92, where the "AUTO" mode indicator is lit up. If another rotation of dial 36 is detected, the heat set point may be updated since the heating set point mode is more recently used than the cooling set point mode. In some examples, controller 20A may change one or both of the cooling set point and the heating set point based on information received a user device of user devices 16 (e.g., user device 16A) of FIGS. 1-2.

In some examples, user device 16A may represent a smart phone, a tablet, a desktop computer, or another device configured to execute an application for controlling one or more parameters of controller 20A. As such, controller 20A may receive information indicative of a user selection of the heating set point and/or a user selection of the cooling set point, and controller 20A may set the heating set point and/or the cooling set point based on the information indicative of the user selection.

FIG. 5C is a conceptual diagram illustrating the analog display 38 of FIGS. 5A-5B including configurations 94A-94D in which a first temperature set point runs into another temperature set point, in accordance with one or more techniques described herein. For example, if the heating set point is initially lower than the cooling set point and HVAC controller 20A subsequently increases the heating set point from a first value to a second value that is greater than the cooling set point, HVAC controller 20A may also increase the cooling set point to the second value. As seen in configuration 94A of analog display 38, the heating set point is initially at marker 502 and the cooling set point is initially at marker 504. When the heating set point is increased to marker 506 in configuration 94C, the cooling set point is also increased to marker 506. Subsequently, of the heating set point is moved back below the original setting of the cooling set point (e.g., marker 504), as seen in configuration 94D, the cooling set point may be decreased from marker 506 to the original marker 504. In configurations 94A-94C, a user rotates dial 36 clockwise to change a heat set point. In configuration 94D, a user rotates the dial counterclockwise to change a heat set point.

Figure 5D:
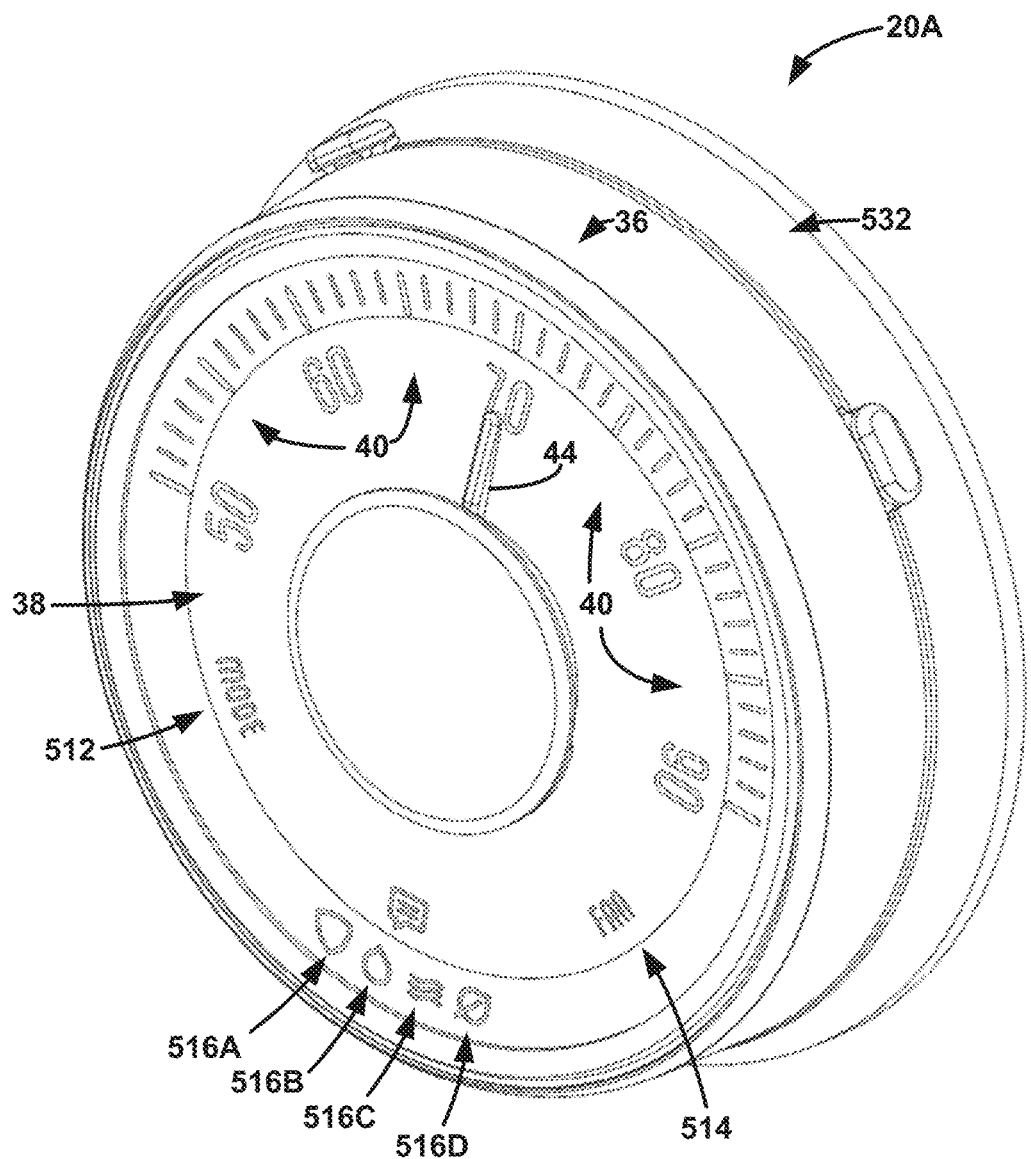
FIG. 5D is a conceptual diagram illustrating a perspective view of the controller of FIGS. 5A-5C, in accordance with one or more techniques described herein.

FIG. 5D is a conceptual diagram illustrating an example perspective view of the controller 20A FIGS. 5A-5C, in accordance with one or more techniques described herein. As seen in FIG. 5D, analog display 38 includes a set of markers 40, a pointer 44, mode indicators 512, fan indicators 514, and indicators 516. At least a portion of controller 20A may be substantially cylindrical in shape, with a front face including analog display 38, a side face including dial 36 which is rotatable with respect to analog display 38, and a back face which is fixed to wall plate 532. The controller illustrated in FIG. 5D is one example of controller 20A of FIGS. 1-2 and FIGS. 5A-5D, but controller 20A of FIGS. 1-2 and FIGS. 5A-5D is not meant to be limited to the example of FIG. 5D. Controller 20 may include other example controllers not illustrated in FIG. 5D.

Figure 6:
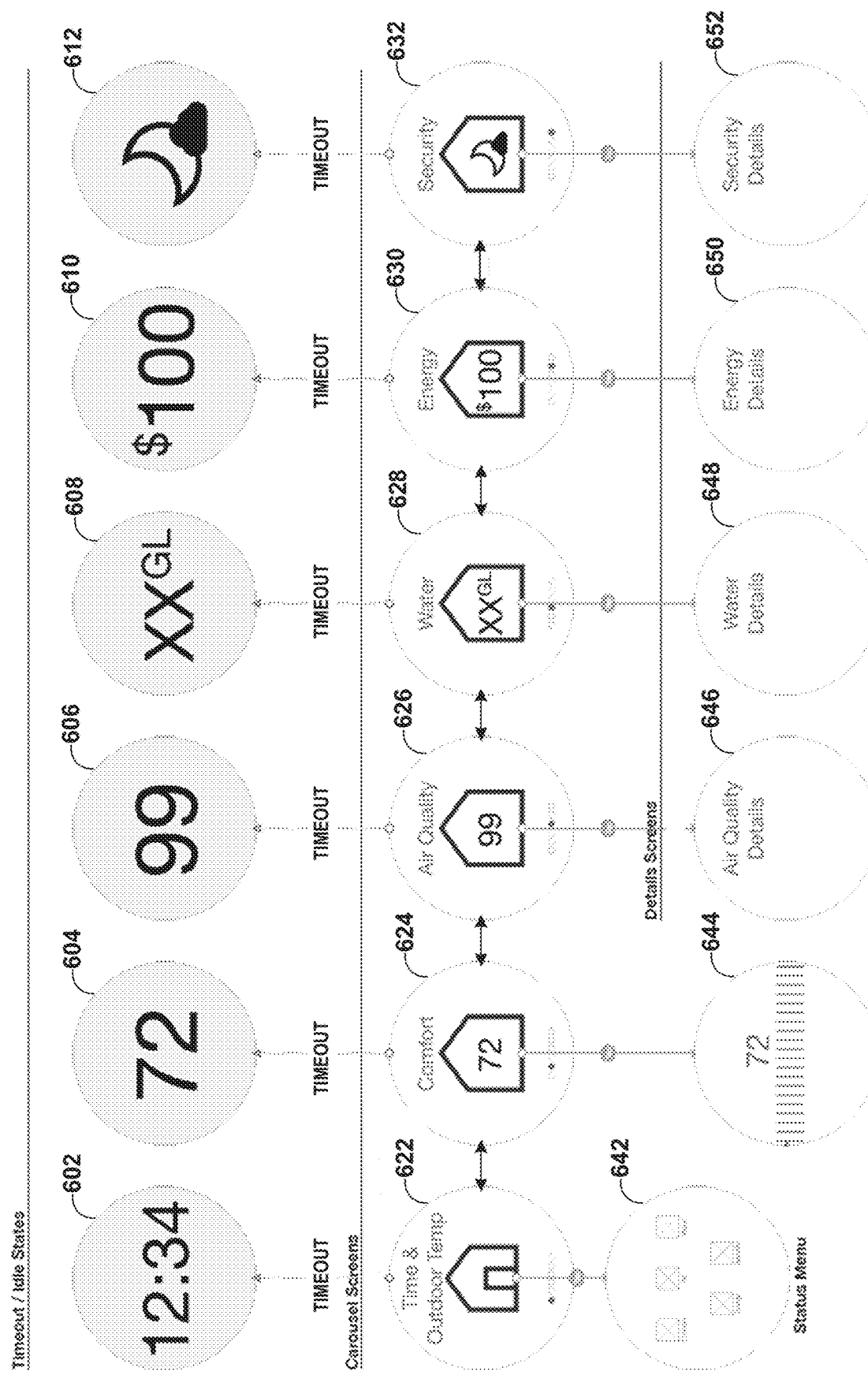
FIG. 6 is a conceptual diagram illustrating a sequence of carousel screens.

FIG. 6 is a conceptual diagram illustrating a sequence of carousel screens 622-632, each carousel screen of the sequence of carousel screens corresponding to an idle screen of a set of idle screens 602-612, and each carousel screen of the sequence of carousel screens corresponding to a details screen of the set of details screens 642-652, in accordance with one or more techniques described herein. In some examples, any one of idle screens 602-612, carousel screens 622-632, and details screens 642-652 may be displayed by digital display 46 of HVAC controller 20B of FIG. 3. In some examples, a user of HVAC controller 20B may scroll through the sequence of carousel screens 622-632 based on a user input (e.g., a swipe, a tap, or another tough movement) to digital display 46. In some examples, if HVAC controller 20B swipes through the sequence of carousel screens 622-632 and ends on a particular carousel screen of the sequence of carousel screens 622-632, HVAC controller 20B may set the particular carousel screen as a default carousel screen for HVAC controller 20B.

The sequence of carousel screens 622-632 may include a time & outdoor temp carousel screen 622, a comfort (e.g., inside temperature) carousel screen 624, an air quality carousel screen 626, a water usage carousel screen 628, an energy usage carousel screen 630, and a security carousel screen 632. In some examples, after HVAC controller 20B ceases scrolling through the sequence of carousel screens and stops on a particular carousel screen such as the air quality carousel screen 626, controller 20B may display the air quality idle screen 606 after a period of time, where the air quality idle screen 606 corresponds to the air quality carousel screen 626. In some examples, idle screens 602-612 bay be dimmer as compared with carousel screens 622-632.

In some examples, if the digital display 46 is displaying any one of the set of idle screens 602-612 or any one of the sequence of carousel screens 622-632, HVAC controller 20B may change one or more temperature set points in response to a rotation of dial 36. For example, if digital display 46 is displaying the water usage idle screen 608 and processing circuitry 22 receives information indicative of a rotation of dial 36, processing circuitry 22 may output an instruction for digital display 46 to display the comfort carousel screen 624. Additionally, or alternatively, processing circuitry 22 may update one or more temperature set points in response to the rotation of dial 36. However, if digital display 46 is displaying one of the set of details screens 642-652 when processing circuitry 22 receives information indicative of a rotation of dial 36, processing circuitry 22 may change a nature of the respective one of the set of details screens 642-652 based on the rotation of dial 36 without changing one or more temperature set points. For example, a details screen such as the water usage screen 648 may include scrollable options, and a rotation of dial 36 may cause HVAC controller 20B to scroll through the scrollable options.

In some examples, if electronic display 46 is displaying a carousel screen of carousel screens 622-632, processing circuitry 22 may receive information indicative of a user selection of a menu button of the respective carousel screen. In response to receiving the information indicative of the selection of the menu button, processing circuitry 22 may display the details screen of details screens 642-652 which corresponds to the respective carousel screen of carousel screens 622-632. By switching digital display 46 to a details screen, processing circuitry 22 of HVAC controller 20B may change a function of dial 36 from controlling one or more temperature set points to scrolling through material which is part of the respective details screen. In this way, while a details screen of the set of details screens 642-652 is displayed, the material of the respective details screen may be scrolled, selected, changed, or any combination thereof based on one or both of a rotation of dial 36 or a user input to digital display 46. In some examples, one or more aspects of material displayed by digital display 46 may change based on outdoor weather and/or a time of day.

Dial 36 may represent a physical ring which exists surrounding the digital display 46. Rotating dial 36 is one type of input, while touching, swiping, or otherwise interacting directly on digital display 46 is a second type of input. Either the first type of input or the second type of input may be used to navigate display screens 642-652, without a rotation of dial 36 causing a temperature set point to change. In some examples, processing circuitry 22 may be able to perform the same functions based on the first type of input and the second type of input with respect to display screens 642-652. For example, processing circuitry 22 may be configured to scroll through options on the water consumption details screen 648 based on a rotation of dial 36 and processing circuitry 22 may be configured to similarly scroll through options on the water consumption details screen 648 based on receiving information indicative of a user instruction to scroll input to digital display 46.

Figure 7:
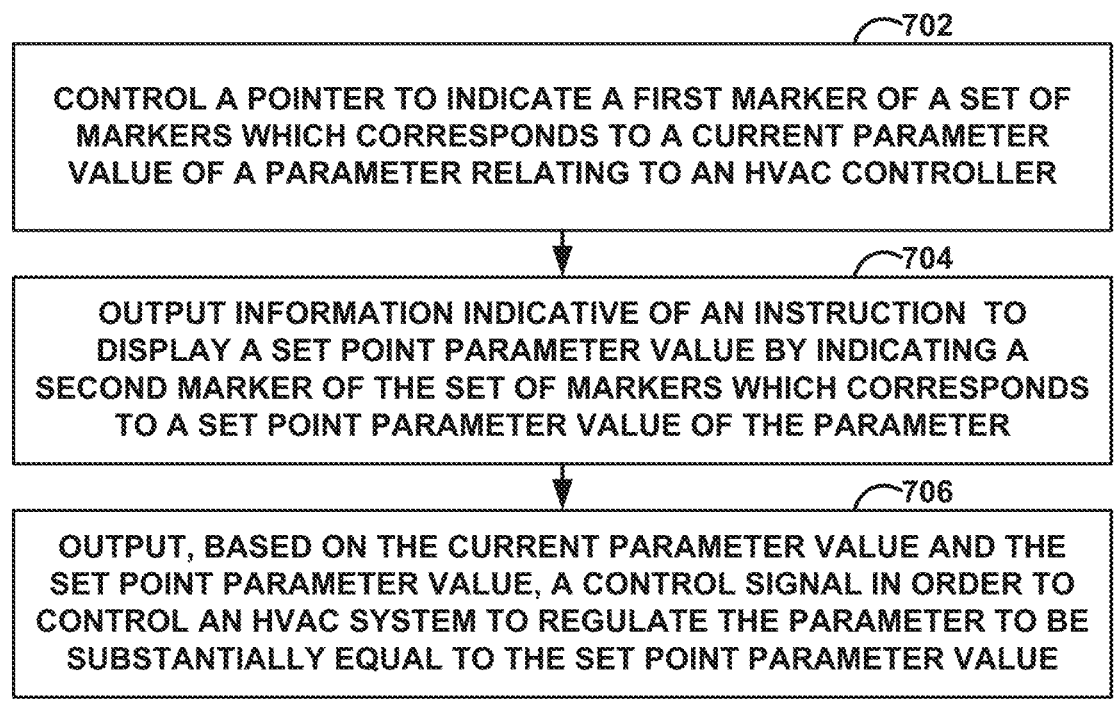
FIG. 7 is a flow diagram illustrating an example operation for controlling an HVAC system such as the HVAC system of FIGS. 1-3, in accordance with one or more techniques described herein.

FIG. 7 is a flow diagram illustrating an example operation for controlling an HVAC system such as HVAC system 50 of FIGS. 1-3, in accordance with one or more techniques described herein. FIG. 7 is described with respect to HVAC controller 20A and HVAC system 50 of FIGS. 1-2. However, the techniques of FIG. 7 may be performed by different components of HVAC controller 20A and HVAC system 50 or by additional or alternative devices.

Processing circuitry 22 may be configured to control pointer 44 to indicate a first marker of a set of markers 40 which corresponds to a current parameter value of a parameter relating to HVAC controller 20 (702). In some examples, the parameter may represent temperature and the current parameter value represents a current temperature value in an area in which HVAC controller 20 is located. In some examples, pointer 44 is connected to an electric motor 42 (e.g., an electric stepper motor). Processing circuitry 22 is configured to move pointer 44 in order to cause pointer 44 to point at a marker of a set of markers 40 which corresponds to the current temperature.

Processing circuitry 22 is configured to output information indicative on an instruction to display a set point parameter value by indicating a second marker of the set of markers which corresponds to a set point parameter value of the parameter (704). In some examples, processing circuitry 22 is configured to activate one or more LEDs of a set of LEDs in dial 36 in order to indicate the set point parameter value. In some examples, the set point parameter value represents a set point temperature. Processing circuitry 22 is configured to output, based on the current parameter value and the set point parameter value, a control signal in order to control HVAC system 50 to regulate the parameter to be substantially equal to the set point parameter value (704).

Figure 8:
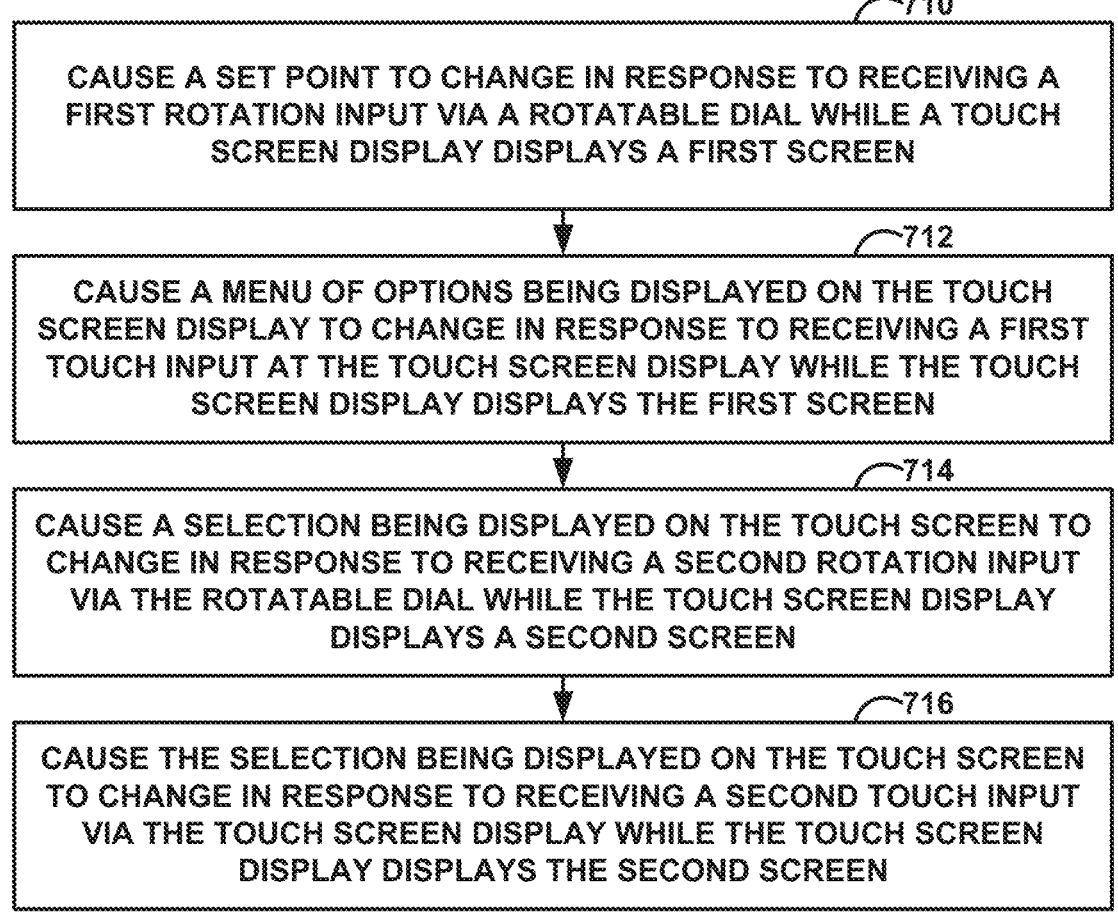
FIG. 8 is a flow diagram illustrating an example operation for navigating a screen displayed by a digital display, in accordance with one or more techniques described herein.

FIG. 8 is a flow diagram illustrating an example operation for navigating a screen displayed by digital display 46, in accordance with one or more techniques described herein. FIG. 8 is described with respect to HVAC controller 20B and HVAC system 50 of FIG. 1 and FIG. 3. Additionally, FIG. 8 is described with respect to idle screens 602-612, carousel screens 622-632, and details screens 642-652 of FIG. 6. However, the techniques of FIG. 8 may be performed by different components of HVAC controller 20B and HVAC system 50 or by additional or alternative devices.

Processing circuitry 22 of HVAC controller 20B may be configured to cause a set point to change in response to receiving a first rotation input via a rotatable dial 36 while a touch screen display such as digital display 46 displays a first screen (710). In some examples, the first screen includes one of idle screens 602-612 or one of carousel screens 622-632. As such, a default function of dial 36 may be to control one or more set point temperature values. Subsequently, processing circuitry 22 may be configured to cause a menu of options to being displayed on the touch screen display to change in response to receiving a first touch input at the touch screen display while the touch screen display displays the first screen (712). In some examples, the first touch input represents a user selection of a menu button on one of carousel screens 622-632, causing digital display 46 to display a corresponding one of details screens 642-652.

Processing circuitry 22 is configured to cause a selection being displayed on the touch screen to change in response to receiving a second rotation input via the rotatable dial while the touch screen display displays a second screen (714). In other words, while digital display 46 displays one of details screens 642-652, dial 36 may control the selection being displayed on digital display 46 rather than controlling one or more temperature set points. Additionally, processing circuitry 22 may cause the selection being displayed on the touch screen to change in response to receiving a second touch input via the touch screen display while the touch screen display displays the second screen (716). In other words, touch input to digital display 46 may control the selection being displayed on digital display 46 in a similar manner to a rotation of dial 36 while digital display 46 displays one of details screens 642-652. Thus, when some screens are being displayed dial 36 and digital display 46 may functional as alternative inputs that perform the same function, e.g., navigating a menu hierarchy. When other screens are being displayed, dial 36 and digital display 46 may perform different functions. As one example, when an idle screen or home screen is being displayed a rotation of dial 36 may cause a setpoint to change whereas a touch input at display 46 may cause a menu option to be selected. In some examples, the touch screen is a full color touch screen.

Figure 9:
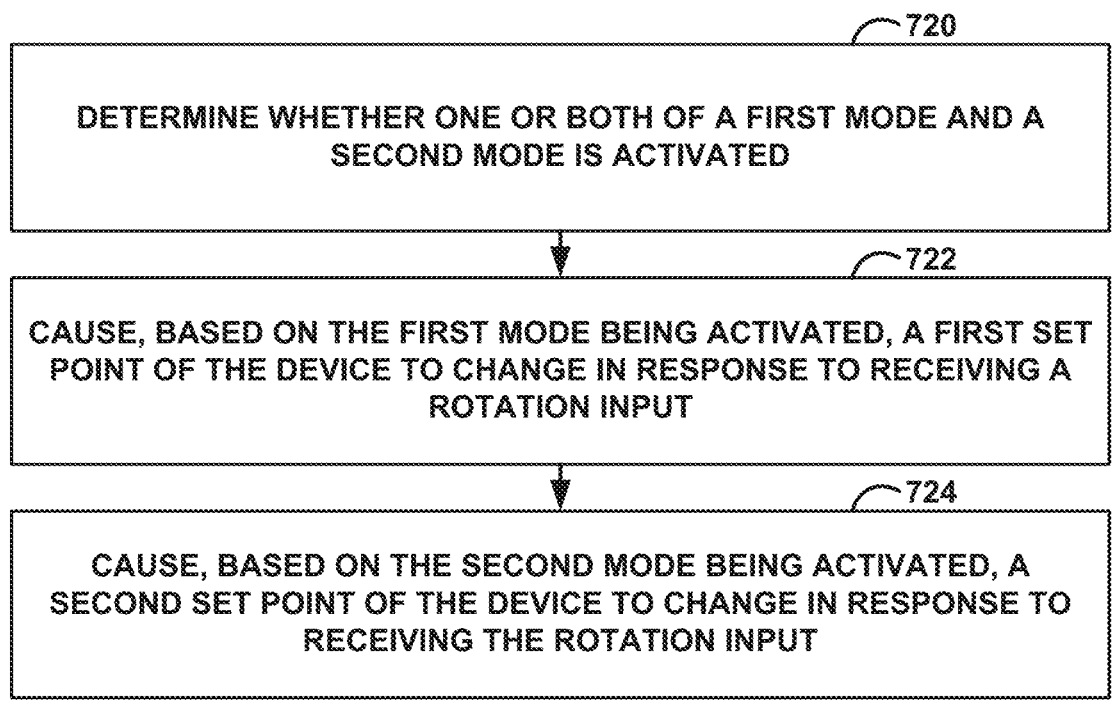
FIG. 9 is a flow diagram illustrating an example operation for changing one or more temperature set points of the HVAC controller of FIGS. 1-2, in accordance with one or more techniques described herein.

FIG. 9 is a flow diagram illustrating an example operation for changing one or more temperature set points of the HVAC controller 20A of FIGS. 1-2, in accordance with one or more techniques described herein. FIG. 9 is described with respect to HVAC controller 20A and HVAC system 50 of FIGS. 1-2. However, the techniques of FIG. 9 may be performed by different components of HVAC controller 20A and HVAC system 50 or by additional or alternative devices.

Processing circuitry 22 may be configured to determine whether one or both of a first mode and a second mode is activated (720). The first mode may represent a cooling temperature set point mode which allows controller 20B to change a cooling set point and the second mode may represent a heating set point mode which allows controller 20B to change a heating set point. Processing circuitry 22 may cause, based on the first mode being activated, the first set point of the device to change in response to receiving a rotation input (722). For example, processing circuitry 22 may cause the heating set point to change in response to receiving the rotation input. Processing circuitry 22 may cause, based on the second mode being activated, a second set point of the device to change in response to receiving the rotation input (724). For example, processing circuitry 22 may cause the cooling set point to change in response to receiving the rotation input.

Figure 10:
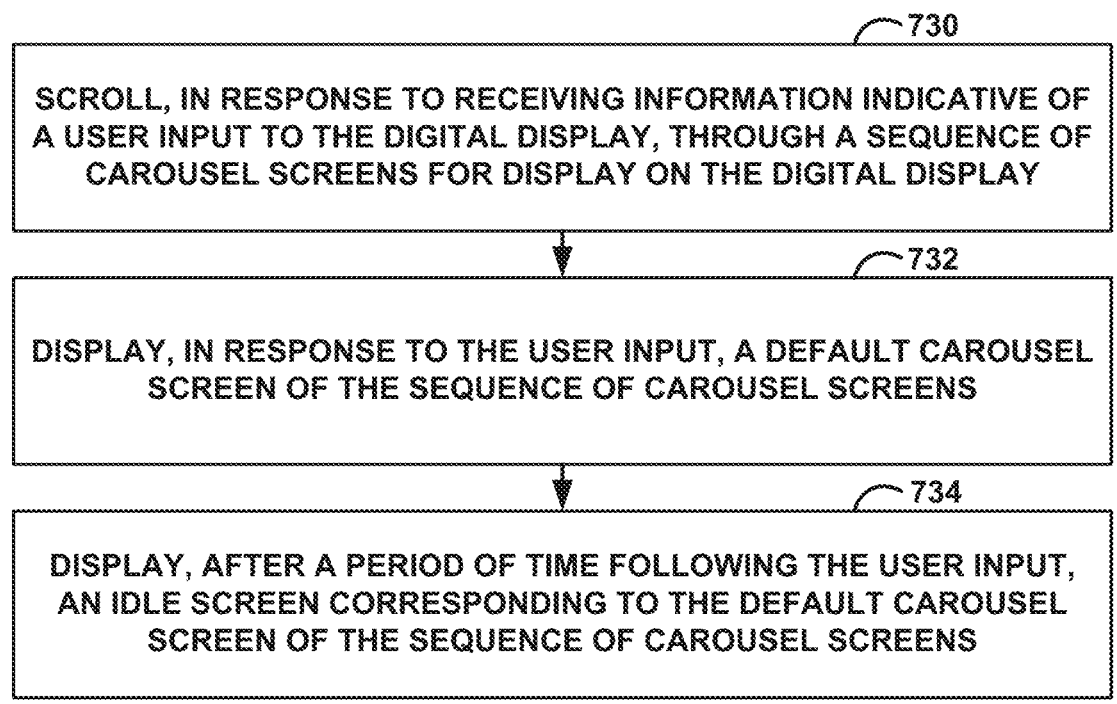
FIG. 10 is a flow diagram illustrating an example operation for navigating one or more screens for display by a digital display, in accordance with one or more techniques described herein.

FIG. 10 is a flow diagram illustrating an example operation for navigating one or more screens for display by digital display 46, in accordance with one or more techniques described herein. FIG. 10 is described with respect to HVAC controller 20B and HVAC system 50 of FIG. 1 and FIG. 3. Additionally, FIG. 10 is described with respect to idle screens 602-612, carousel screens 622-632, and details screens 642-652 of FIG. 6. However, the techniques of FIG. 10 may be performed by different components of HVAC controller 20B and HVAC system 50 or by additional or alternative devices. Processing circuitry 22 may be configured to scroll through a sequence of carousel screens 622-632 in response to receiving information indicative of a user input to digital display 46 (730). Subsequently, processing circuitry 22 may display, in response to the user input a default carousel screen of the sequence of carousel screens 622-622 (732). Processing circuitry 22 may display, after a period of time following the user input, an idle screen corresponding to the default carousel screen of the sequence of carousel screens 622-632 (734).

Figure 11:
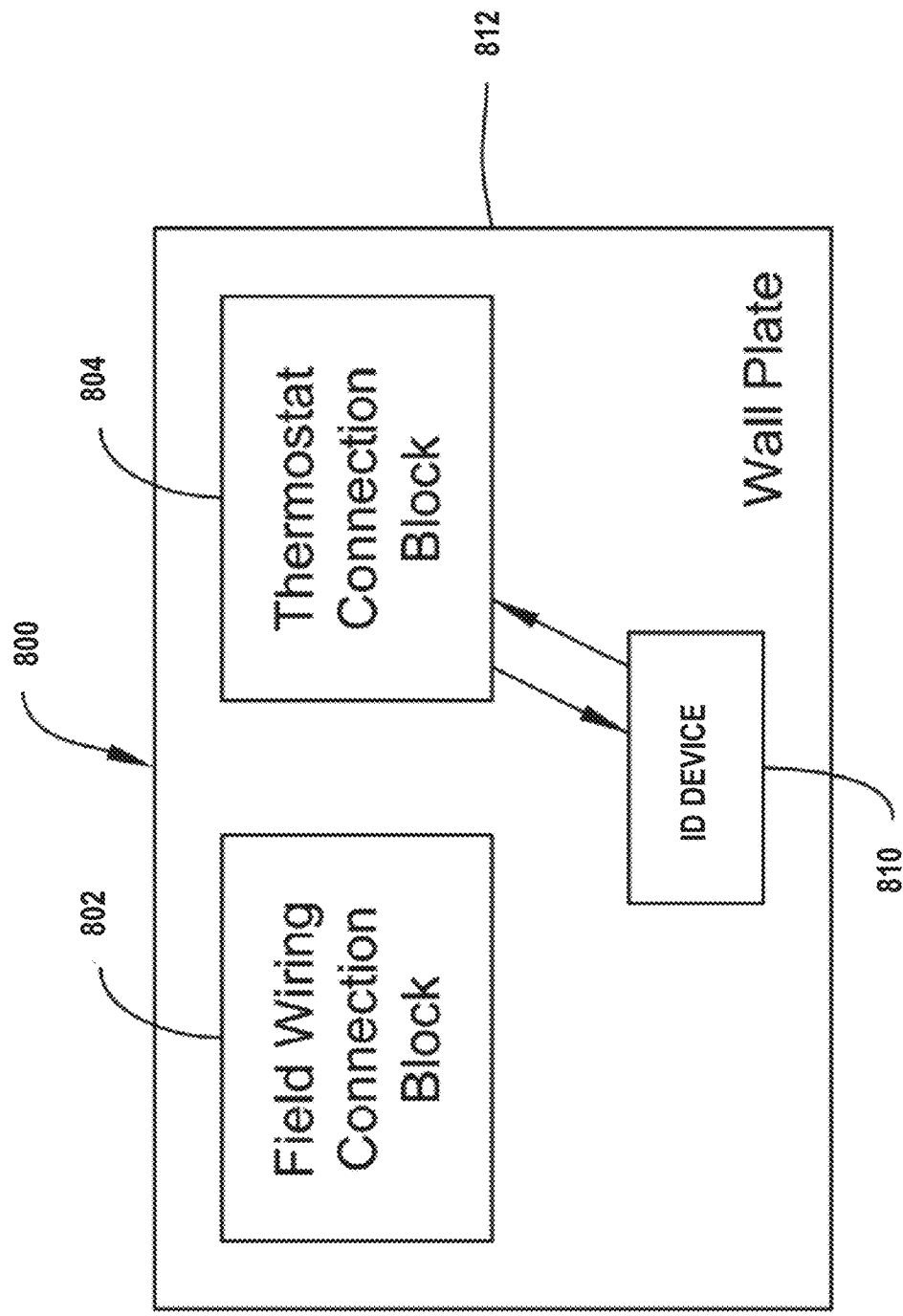
FIG. 11 is a block diagram of on an example wall plate including an ID device according to one or more techniques of this disclosure.

FIG. 11 shows a block diagram of on an example wall plate that includes an ID device 810. Wall plate 812 is an example of a wall mountable connector that may be used in combination with one or more head units that include a controller for one or more systems that control the environment of spaces within a building, such as HVAC system 50. The one or more head units may, for example, be head units of HVAC controller 20A or HVAC controller 20B described above. In some examples, certain components and functions of HVAC controller 20A or HVAC controller 20B may be implemented wholly or partially in a wall plate, like wall plate 800 of FIG. 11.

In the example of FIG. 11, wall plate 800 includes a housing 812 that may be configured to be mounted to a wall and is configured to provide a standardized mechanical connection between the wall plate 800 and a head unit. Although shown as being rectangular in the example of FIG. 11, housing 812 may be circular or any other shape. As used in this disclosure, the term "controller" may be used to refer to just a head unit or the combination of a head unit with a wall plate. Wall plate 800 may include a field wiring connection block 802 that is configured to provide an electrical connection between the wall plate 800 and a plurality of field wires that are coupled with the HVAC system. In some cases, the field wiring connection block 802 may be replaced by a wireless connection block that is configured to provide wireless communication between the wall plate 800 and an HVAC system that is to be controlled via the wall plate 800. A thermostat connection block 804 may provide a standardized electrical connection between the wall plate 800 and the head units. Wall plate 800 may be electrically coupled to a controller via the thermostat connection block 804, and the wall plate 800 may be communicatively coupled to the HVAC system via the field wiring connection block 802 and/or the wireless connection block (not shown). When so provided, there may be a standardized mechanical and electrical connection to the wall plate 800 such that controller may be removed and replaced with the second controller.

In some cases, the wall plate 800 may further include an ID device 810. ID device 810 may be configured to provide information, such as an identification value, to enable a head unit to identify the type and configuration of wall plate 812. For example, a wall plate, like wall plate 812, that is configured to control environmental control equipment such as a forced air HVAC system with a furnace and an air conditioning unit, may have a different configuration from a wall plate configured to control an evaporative cooling system, and thus an associated head unit may also need a different configuration. Similarly, a wall plate configured to control a forced air HVAC system in a first region of the world may have a different configuration from a wall plate for a forced air HVAC system in a different region of the world. For example, some HVAC systems in North America include a 24 V control signals that are stepped down from line voltage by a transformer. In other regions, the control signals may be at line voltage, which may be 100V, 120V, 230V or 240V, depending on the particular country. Evaporative cooling systems are an example of systems that may operate with line voltage control signals.

A head unit connected to wall plate 812 may determine the configuration and type of wall plate 812 based on ID device 810. The head unit may be configured to adapt to the HVAC systems connected to wall plate 812. For example, a head unit connected to a wall plate configured for an evaporative cooling system may set configuration parameters to control line voltage relays that control the blower speed and water pump of the evaporative cooling system based on ID device 810. A head unit connected to a wall plate configured for a geothermal heat pump may be configured differently than a controller connected to a wall plate configured for a forced air HVAC system with a natural gas fired furnace, based on ID device 810. A head unit connected to a wall plate in North America (115V, 60 Hz) may be configured differently from the same head unit connected to a wall plate in Japan (100V, 50 Hz), based on ID device 810.

ID device 810 may be implemented with a variety of techniques. As a first example, ID device 810 may be a resistor with a specified impedance value. A controller connected to wall plate 812 may determine an identification value of ID device 810 by, for example by measuring the impedance value of the resistor, comparing the measured impedance to a look-up table in the memory of the controller, and configuring the controller based on the look-up table.

In other examples, ID device 812 may be implemented as one or more switches or jumpers, such as dual inline package (DIP) switches. In other examples, ID device 810 may be implemented as a microcontroller, read only memory, or other processing circuitry, that may interact with the controller in the head unit. In other examples, ID device 812 may be implemented as a combination of components, for example DIP switches and a resistor, a memory device along with a resistor network, or any other combination of components.

In some examples, a head unit connected to wall plate 812 may measure the resistance, DIP switch value, or other information, and communicate with a network, a mobile device, or similar computing device external to the controller to retrieve the information about how to configure the controller. In other examples, the head unit may locally store the information about how to configure the controller.

In some examples ID device 810 may include a memory accessible by the controller. The head unit may read a value from the memory of ID device 810, and configure the controller based on the value. In some examples, the memory may also be configured to store data and/or other information that was communicated to the ID device 810 by a controller. In some examples, ID device 810 may be configured to communicate the stored data and/or information to a subsequently installed second head unit. For examples the ID device 810 may be configured to, automatically or on-command, communicate the stored data and/or information to the subsequently installed second controller to at least partially configure the subsequently installed second controller using settings from the first controller.

In some examples, a head unit may configure other types of settings based on ID device 810. For example, wireless connectivity settings in some regions of the world may be different than the connectivity settings in other regions. ID device 810 may also be configured to provide information to a controller about the type of wireless protocol to be used, e.g. WiFi, BLUETOOTH, ZigBee (IEEE 80215.4) and similar wireless protocols as well as wired communication protocols. For example, the WiFi protocols, e.g. frequency, data format and so on, may have requirements in parts of Europe that may be different from other regions of the world. A head unit connected to a wall plate for France may read ID device 810 and configure the communication protocols to meet the requirements for France.

In other examples, a head unit may unlock or disable certain features based on the type of wall plate and configuration of ID device 810. For example, a head unit connected to a first wall plate may activate features that communicate with a mobile device, such as a smart phone or tablet. The same head unit connected to a different wall plate with a different ID device, may disable communication with mobile devices. This feature may be useful, for example, for applications in which security is a priority for the user.

In some examples, the value of ID device 810 may cause a head unit of an environmental control device connected to ID device 810 to access a second computing device to download additional configuration settings. The second communication device may be a server connected to a common network with the head unit, a mobile device, or similar computing device. In other words, the head unit, which may control HVAC equipment or other environmental control equipment, may include transceiver circuitry or other communication circuitry, configured to transmit the identification value from ID device 810 to a remote device, and in response, receive from the remote device the one or more operating parameters for the HVAC control device. The additional configuration settings may include location specific settings, e.g. regarding weather and climate, user preferences from other systems, and similar configuration settings.

Wall plate 812 with ID device 810 may provide several advantages over other types of systems. For example, a head unit connected to wall plate 812 may confirm a setup based on wire detection, as well as determine additional settings, such as wireless connectivity configuration. ID device 810 may simplify the setup process for an installer attempting to replace or install a controller for an HVAC system by limiting the number of set up configurations required. For example, a head unit may determine the wall plate is configured for a heat pump, and therefore may display only setup configuration screens for the heat pump and skip setup configurations for furnace, electric heat and so on.

Figure 12:
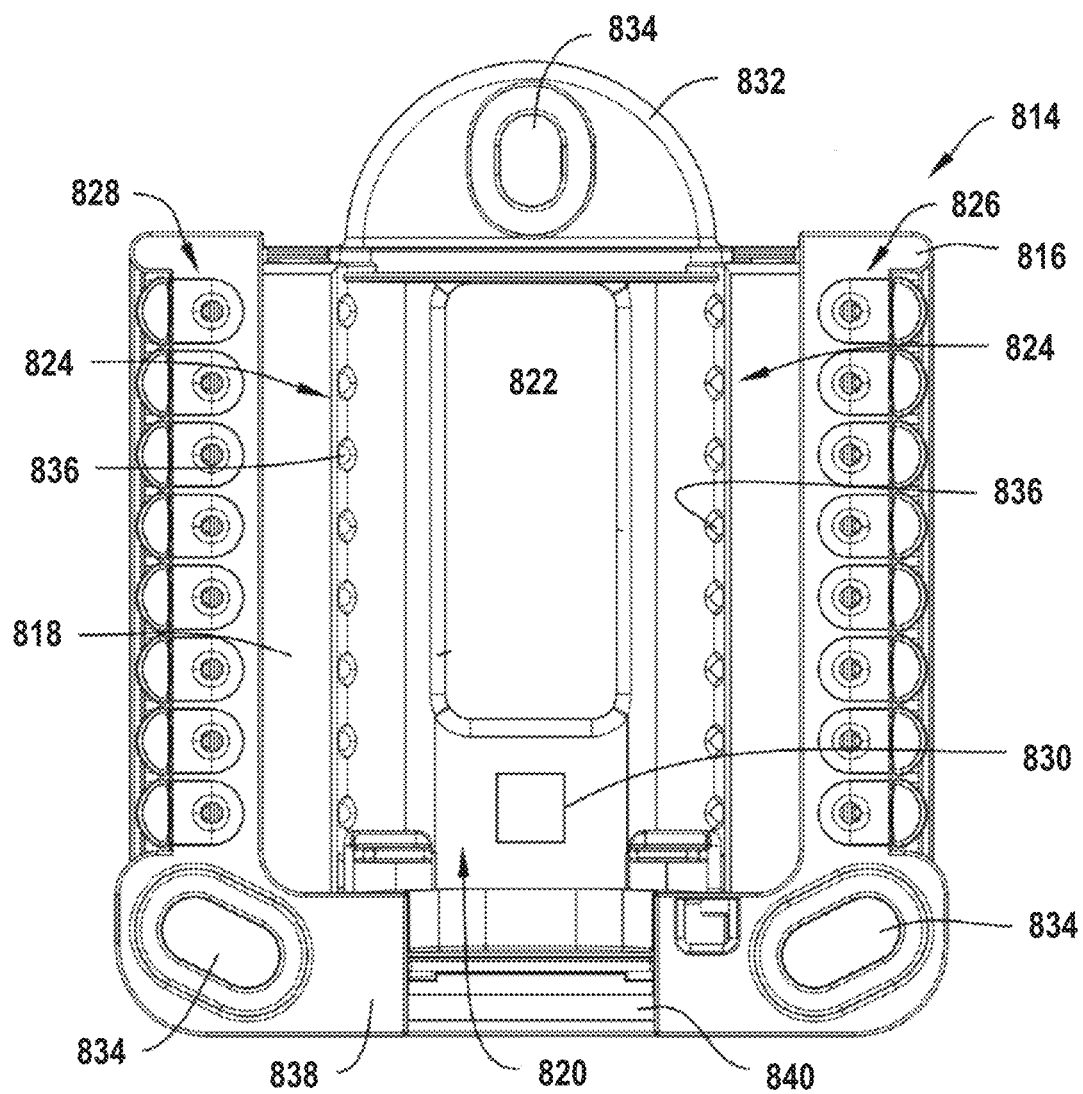
FIG. 12 is a conceptual diagram of an example wall plate configured to receive a head unit with a controller for an HVAC system, according to one or more techniques of this disclosure.

FIG. 12 is a conceptual diagram of an example wall plate configured to receive a head unit with a controller for an HVAC system, according to one or more techniques of this disclosure. Wall plate 814 is a wall mountable connector and is an example of wall plate 812 described above in relation to FIG. 11. Some examples of wall plate 814 may include more or fewer features than shown in FIG. 12.

In the example of FIG. 12, wall plate 814 includes housing 816, recess 818, wiring connection blocks 824 configured to electrically connect to one or more field wires and may include a first column 828 of pin terminals and a second column 826 of pin terminals. Pin terminals 826 and 828 may be configured to accommodate a first column of pins and a second column of pins extending backward from a controller, such as a thermostat. Wall plate 814 may also include mounting tab 832, mounting apertures 834, wiring terminals 836, front side 838 and hinge support 840. Each of the wiring terminals 836 may be electrically coupled with a corresponding pin terminal of the column 824 and 828 of pin terminals.

Housing 816 may define a field wire receiving cavity 820. The field wire aperture 822 may be configured to accommodate one or more field wires exiting the wall and passing through the field wire aperture 822. The housing 816 also defines a field wire aperture 822 that extends through the back side of the housing 816 and into the field wire receiving cavity 820. In some cases, the field wire receiving cavity 820 may be a space in front of the field wire aperture 822. In some cases, the sides of the field wire receiving cavity 820 may be beveled to provide easier access to wiring terminals of the wall plate 814 and to facilitate attachment of field wires.

Housing 816 may also include ID device 830, which is an example of ID device 810 described above in relation to FIG. 11 and has the same functions and characteristics as ID device 810. In some examples, the ID device 830 may be disposed somewhere within the field wire receiving cavity 820.

Figure 13:
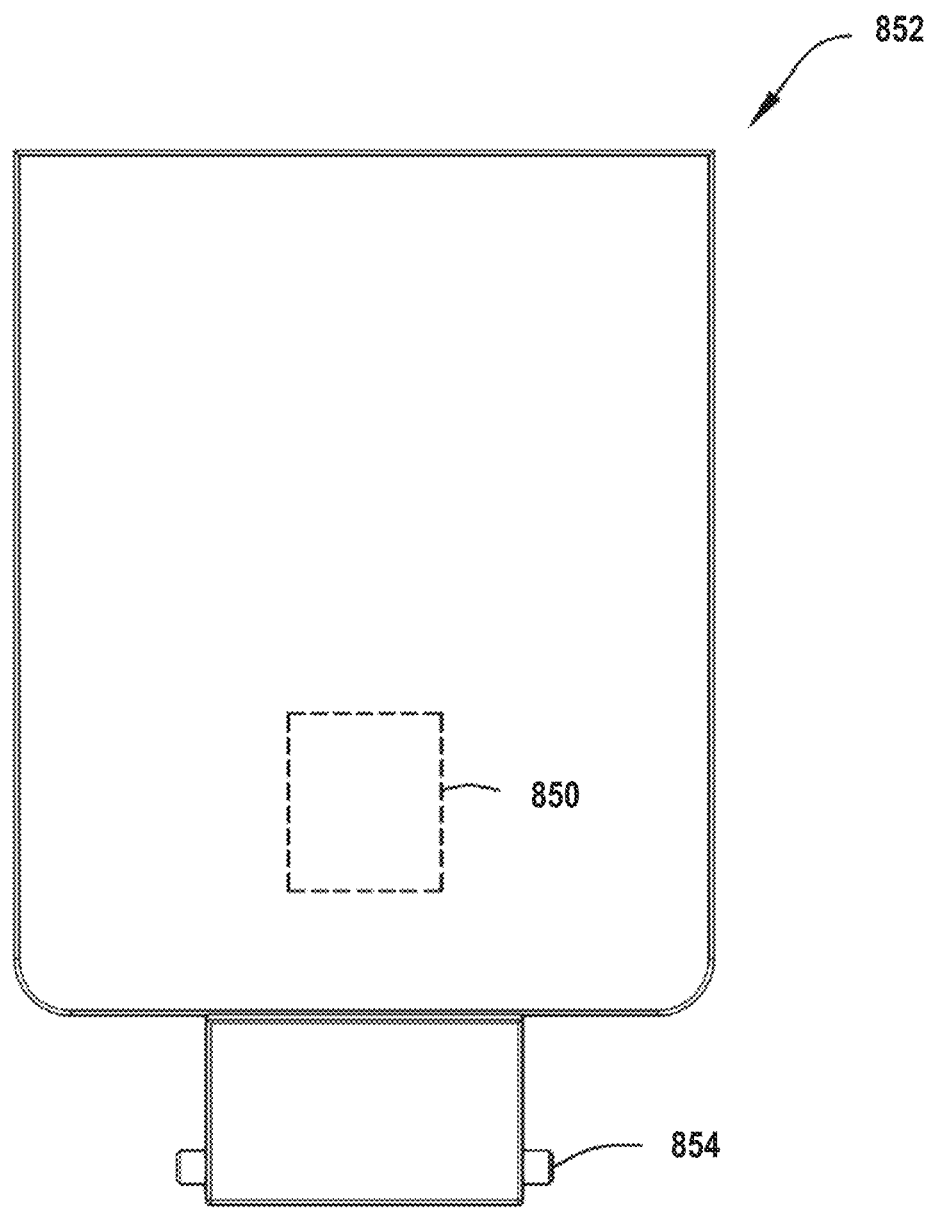
FIG. 13 is a conceptual diagram of a cover for an environmental control device illustrating one possible location for an ID device according to one or more techniques of this disclosure.

FIG. 13 is a conceptual diagram of a cover for an HVAC control device illustrating a possible location for an ID device according to one or more techniques of this disclosure. The example of FIG. 13 is a door or cover that may cover the field wires and aperture 822 of wall plate 814 described above in relation to FIG. 12.

Door 852 may include a hinge 854 that interacts with a corresponding hinge support 840 on the wall plate 814 as described above in relation to FIG. 12. Hinge 854 may enable the door to be opened or closed as desired without entirely removing the door 852 from the wall plate 814.

In some examples, ID device 850 may be secured to a back side of the door 852, as shown in phantom in FIG. 13. ID device 850 is an example of ID device 810 described above in relation to FIG. 11 and has the same functions and characteristics as ID device 810. A controller installed on a wall plate including door 852 may be configured to communicate with ID device 850 and cause the controller to perform certain setup functions based on ID device 850.

In some examples when the door 852 is in a closed position, the door 852 may cover the front side of the field wire receiving cavity 820 and wiring connection blocks 824. When the door 852 is in the open position (as illustrated in FIG. 12), the user may gain access to the field wire receiving cavity 820 and wiring connection blocks 824. In some examples, door 852 may help to ensure that all the field wires are properly tucked in. door 852 may be configured to push against a field wire that extends too far, thus providing feedback to the installer. In some instances, the door 852 may help block airflow into the back of a controller. Absent door 852, air may flow out of the wall, for example, and into the thermostat 82. Such air flow may negatively impact the accuracy of any thermal sensor within the controller.

Figure 14:
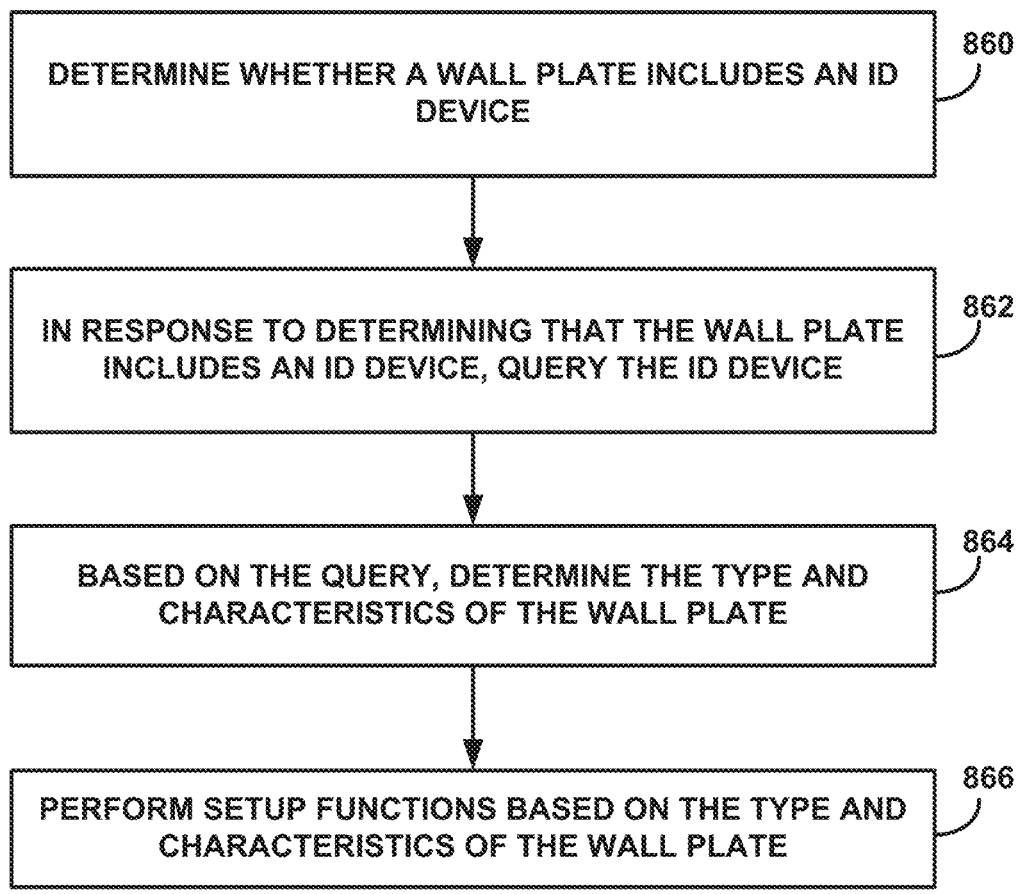
FIG. 14 is a flow diagram illustrating an example operation of an HVAC system including an ID device, according to one or more techniques of this disclosure.

FIG. 14 is a flow diagram illustrating an example operation of an HVAC system including an ID device, according to one or more techniques of this disclosure. The blocks of FIG. 14 will be described in terms of FIG. 11, unless otherwise noted.

In some examples, a user may have an existing wall plate configured to control the specific HVAC system in a building, e.g. a forced air HVAC system, baseboard heaters or in-floor heating supplied by electricity or hot water, a humidifier, de-humidifier, evaporative cooling system and similar equipment. In some examples, a user may install a new wall plate to control new equipment. In some examples, a user may install a new wall plate to add capability to existing equipment. For example, a window air conditioning unit may be controlled by a switch, but by controlling the window unit with a controller, such as controller 20, described above in relation to FIG. 1, a user may add wireless communication and other features described above for controller 20 to the window unit.

The head unit may be installed into the existing, or new, wall plate. The head unit may determine whether the wall plate includes an ID device, such as ID device 810 described above in relation to FIG. 11 (860). As described above in relation to FIG. 11, the ID device may be implemented as a resistor value, switch setting, jumper, memory, or some other manner. In this disclosure, a "wall plate" may be any type device configured to support a head unit, e.g. wall plate 814 described above in relation to FIG. 12, or any similar device configured to mount to other structures.

After determining that the wall plate includes an ID device, the head unit may query the device, for example, by reading the resistance value or switch setting, communicating with the memory or microcontroller, inductive communication or by some other technique (862). Based on the results of the query, and the identification value of the ID device, the controller may determine the type of wall plate to which the controller is connected (864). The type of wall plate may indicate the type and characteristics of equipment that the controller needs to manage, e.g. a heat pump, furnace, air conditioning, electric heat, blowers, and so on. The ID device may also indicate the type of communication protocol to be used.

As described above in relation to FIG. 11, the controller may determine the equipment, and therefore the type of setup required by consulting a look-up table at a memory location of the controller, by communicating with a mobile device via Bluetooth, or some other communication protocol, or, for example, by downloading information from a server connected to the same network to which the controller is connected. Based on the type and characteristics of the wall plate, the controller may select which setup functions the controller should perform, which may include prompting the user for information specific to the characteristics.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "processing circuitry," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Various examples have been described. These and other examples are within the scope of the following claims.

What is claimed is:

1. An environmental control device, comprising:
   a wall plate comprising:
      a thermostat connection block; and
      an identification (ID) device,
         wherein the ID device includes a resistor network;
   a head unit comprising:
      a memory;
      a wall plate connection block configured to communicatively couple the head unit to the wall plate; and
      processing circuitry configured to:
         determine an identification value from the ID device by measuring a resistance of the resistor network;
         based on the identification value, determine information defining environmental control equipment to which the wall plate is configured to connect;
         based on the identification value, automatically configure one or more setup parameters for the environmental control device; and
         present setup parameters for the head unit based on the identification value and the environmental control equipment to which the wall plate is configured to connect,
            wherein the setup parameters presented are limited to those relevant to the environmental control equipment to which the wall plate is configured to connect, and
            wherein the setup parameters presented exclude those relevant to equipment to which the wall plate is not configured to connect.

2. The environmental control device of claim 1, wherein the environmental control equipment comprises one or more of: a gas furnace, a heat pump, a radiant heat system, a boiler, a high volt baseboard, an electric heating unit, and a humidifier.

3. The environmental control device of claim 1, wherein the memory stores a look up table that associates a plurality of identification values with different values for setup parameters of the environmental control device.

4. The environmental control device of claim 1, wherein the head unit further comprises transceiver circuitry configured to transmit the identification value to a remote device, and in response, receive from the remote device the one or more setup parameters for the environmental control device.

5. The environmental control device of claim 1, wherein the wall plate further comprises a field wire connection block configured to connect the wall plate to a heating, ventilation and air conditioning (HVAC) appliance, wherein the thermostat connection block, wall plate connection block, and field wire connection block communicatively couple the processing circuitry to the HVAC appliance.

6. The environmental control device of claim 1, further comprising communication circuitry;
   wherein the one or more setup parameters for the environmental control device comprise parameters of a communication protocol,
   wherein the processing circuitry is configured to determine the parameters of the communication protocol based on the identification value, and
   configure the communication circuitry based on the determined parameters of the communication protocol.

7. The environmental control device of claim 6, wherein the communication protocol comprises a WiFi protocol.

8. The environmental control device of claim 1, wherein limiting the presentation of setup parameters simplifies a setup process for the environmental control device.

9. A method for configuring an environmental control device, the method comprising:
   determining, by processing circuitry of the environmental control device, whether a wall plate to which the environmental control device is connected includes an identification (ID) device, wherein the ID device includes a resistor network;
in response to determining that the wall plate includes the ID device, query the ID device,
querying the ID device including measuring a resistance of a resistor network;
based on the query, determining, by the processing circuitry, an identification value from the ID device, wherein the identification value includes information defining environmental control equipment to which the wall plate is configured to connect;
based on the identification value, determining, by the processing circuitry, a type, and characteristics of the wall plate; and
performing, by the processing circuitry, setup functions for the environmental control device, wherein the processing circuitry presents setup parameters for the environmental control device based on the identification value and the environmental control equipment to which the wall plate is configured to connect,
wherein the setup parameters presented are limited to those relevant to the environmental control equipment to which the wall plate is configured to connect, and
wherein the setup parameters presented exclude those relevant to equipment to which the wall plate is not configured to connect.

10. The method of claim 9, wherein the characteristics of the wall plate include connections for one or more of: a gas furnace, a heat pump, a radiant heat system, a boiler, a high volt baseboard, an electric heating unit, and a humidifier.

11. The method of claim 9, wherein the processing circuitry is configured to store at memory location coupled to the processing circuitry, a look up table that associates a plurality of identification values with different values for setup parameters of the environmental control device.

12. The method of claim 9, further comprising,
communicating with a remote device; and
receiving from the remote device the setup parameters for the environmental control device.

13. The method of claim 9, further comprising:
comparing, by the processing circuitry, the identification value to a lookup table stored at a memory location operatively coupled to the processing circuitry, wherein the lookup table associates a plurality of identification values with different values for the setup parameters of the environmental control device.

14. The method of claim 9,
wherein the environmental control device comprises communication circuitry;
wherein the setup parameters for the environmental control device comprise parameters of a communication protocol,
the method further comprising, determining, by the processing circuitry, the parameters of the communication protocol based on the identification value, and
configuring the communication circuitry based on the determined parameters of the communication protocol.

15. The method of claim 14, wherein the communication protocol comprises a WiFi protocol.

16. A head unit configured as an environmental control device, the head unit comprising:
a memory;
a wall plate connection block configured to communicatively couple the head unit to the wall plate; and
processing circuitry configured to:
communicate with an identification (ID) device via the wall plate connection block, wherein the ID device includes a resistor network;
determine an identification value from the ID device by measuring a resistance of the resistor network;
based on the identification value, determine information defining environmental control equipment to which the head unit is configured to connect via the wall plate connection block;
based on the identification value, automatically configure one or more setup parameters for the environmental control device; and
present setup parameters for the head unit based on the identification value and the environmental control equipment to which the wall plate is configured to connect;
wherein the setup parameters presented are limited to those relevant to the environmental control equipment to which the wall plate is configured to connect, and
wherein the setup parameters presented exclude those relevant to equipment to which the wall plate is not configured to connect.

17. The head unit of claim 16,
wherein the environmental control device comprises communication circuitry;
wherein the one or more setup parameters for the environmental control device comprise parameters of a communication protocol,
the processing circuitry configured to determine:
the parameters of the communication protocol based on the identification value; and
configure the communication circuitry based on the determined parameters of the communication protocol, wherein the communication protocol comprises a WiFi protocol.

* * * * *